(12) United States Patent
Ranganathan

(10) Patent No.: US 12,393,782 B2
(45) Date of Patent: Aug. 19, 2025

(54) SYSTEM AND METHOD FOR DETERMINING INTENTIONS OF MESSAGES

(71) Applicant: Verizon Patent and Licensing Inc., Basking Ridge, NJ (US)

(72) Inventor: Prakash Ranganathan, Tamilnadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 238 days.

(21) Appl. No.: 17/571,766

(22) Filed: Jan. 10, 2022

(65) Prior Publication Data

US 2023/0222291 A1    Jul. 13, 2023

(51) Int. Cl.
| | |
|---|---|
| *G06F 40/30* | (2020.01) |
| *G06N 20/00* | (2019.01) |
| *H04L 51/02* | (2022.01) |
| *H04L 51/21* | (2022.01) |
| *H04L 51/216* | (2022.01) |

(52) U.S. Cl.
CPC .............. *G06F 40/30* (2020.01); *G06N 20/00* (2019.01); *H04L 51/02* (2013.01); *H04L 51/21* (2022.05); *H04L 51/216* (2022.05)

(58) Field of Classification Search
None
See application file for complete search history.

(56) References Cited

U.S. PATENT DOCUMENTS

| | | | |
|---|---|---|---|
| 8,515,736 B1* | 8/2013 | Duta | G06F 40/30 704/9 |
| 8,620,890 B2* | 12/2013 | Bennett | G06F 16/3344 704/10 |
| 10,861,446 B2* | 12/2020 | Yasa | G06N 20/00 |
| 11,289,075 B1* | 3/2022 | Pandey | G10L 15/1815 |
| 2008/0059186 A1* | 3/2008 | Mowatt | G10L 15/193 704/E15.022 |
| 2012/0296635 A1* | 11/2012 | Brockett | G06F 40/166 704/9 |
| 2017/0011742 A1* | 1/2017 | Jing | G06F 40/268 |
| 2017/0099249 A1* | 4/2017 | Kozareva | G06N 5/022 |
| 2018/0039690 A1* | 2/2018 | Zhai | G06F 40/289 |
| 2018/0330011 A1* | 11/2018 | DeLuca | G06F 16/9032 |
| 2018/0341871 A1* | 11/2018 | Maitra | G06N 3/042 |
| 2019/0354586 A1* | 11/2019 | Pasternack | G06N 20/00 |
| 2019/0385611 A1* | 12/2019 | Smythe | G06F 40/40 |
| 2021/0286851 A1* | 9/2021 | Kota | G06N 5/04 |
| 2022/0284049 A1* | 9/2022 | Christensen | G06F 16/3329 |

* cited by examiner

*Primary Examiner* — Jesse S Pullias

(57) ABSTRACT

One or more computing devices, systems, and/or methods for determining an intention of a message and/or performing one or more operations based upon the intention are provided. In an example, a first set of text may be received, from a client device, via a messaging interface. Based upon the first set of text, one or more sets of text semantically similar to the first set of text may be determined. Based upon the first set of text and the one or more sets of text a plurality of intention predictions may be determined. A first intention of the first set of text may be determined based upon the plurality of intention predictions. One or more operations may be performed based upon the first intention.

19 Claims, 13 Drawing Sheets

SYSTEM AND METHOD FOR DETERMINING INTENTIONS OF MESSAGES

BACKGROUND

A chatbot may be used to conduct conversations (e.g., chat conversations) with users of a service. For example, the chatbot may be used to facilitate customer service related to an entity such as at least one of a telecommunication service provider, a store, an airline, etc.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1A:
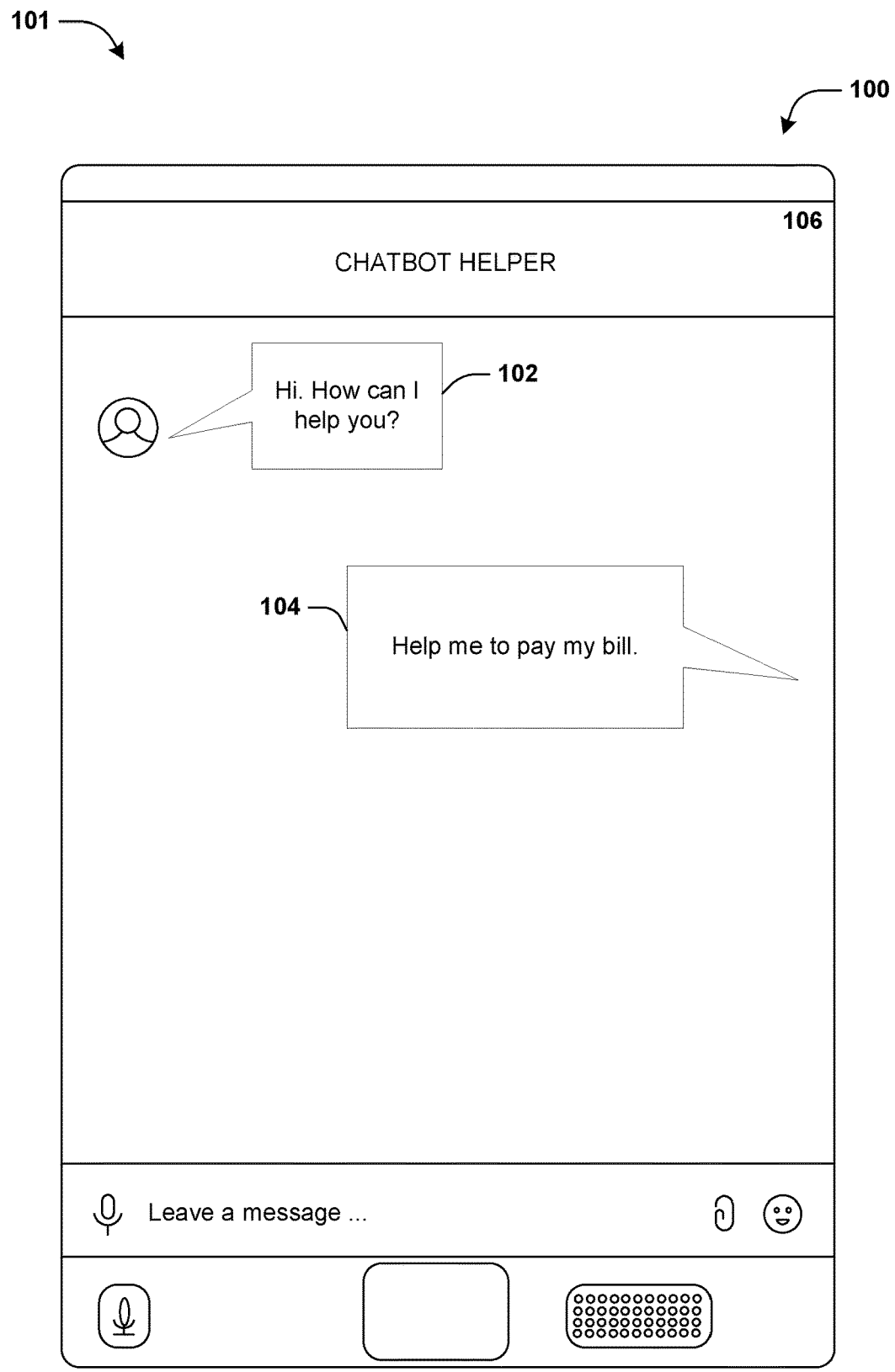
FIG. 1A is a diagram illustrating an example system for determining an intention of a message and/or performing one or more operations based upon the intention, where a messaging interface is displayed via a first client device according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

One or more systems and/or techniques for determining an intention of a message and/or performing one or more operations based upon the intention are provided. A user may interact with a chatbot system via a messaging interface. For example, the chatbot system may receive a message from the user, and may be configured to determine an intention of the message. The intention may correspond to a purpose and/or goal, of the user, for inputting (e.g., typing) and/or sending the message. The chatbot system's response to the message may depend upon the determination of the intention. For example, the chatbot system may respond to the message by providing information and/or performing one or more actions if the intention is determined to be a particular intent, and/or the chatbot system may respond to the message by providing different information and/or performing one or more other actions if the intention is determined to be another intent. Determining the intention incorrectly and/or intention determination failure (e.g., intention determination failure is when the chatbot system is not able to determine an intention of the message) may result in a negative user experience of the user (e.g., as a result of the user being provided with undesired information that the user did not request and/or as a result of the user having to spend more time to achieve the desired response from the chatbot system). Alternatively and/or additionally, if the intention is determined incorrectly, if the chatbot system responds to the message with an undesired response and/or if the chatbot fails to properly determine the intention of a user text, the user may be required to interact with a live agent (e.g., a customer service agent) to achieve the desired response (e.g., the user may be transferred from interacting with the chatbot system to the live agent), thereby increasing costs and manual effort for providing the user with the desired response.

Accordingly, as provided herein, one or more sets of text (e.g., one or more messages) may be generated based upon the message received from the user. The one or more sets of text may be semantically similar to the message. A plurality of intention predictions may be determined based upon the message from the user and the one or more sets of text. In an example in which the one or more sets of text is 10 sets of text that are semantically similar to the message, the plurality of intention predictions may comprise 11 intention predictions (e.g., 1 intention prediction for the message and 10 intention predictions for each set of text of the 10 sets of text). An intention determination module uses the plurality of intention predictions to arrive at a single intention prediction for the message. It may be appreciated that an intention of the message (e.g., the intention indicated by the single intention prediction) may be determined with increased accuracy as a result of using the one or more semantically similar sets of text, in addition to the message, to determine the intention of the message. Alternatively and/or additionally, as a result of generating the one or more sets of text and/or using the plurality of intention predictions to determine the intention of the message, a likelihood that intention determination failure occurs may be reduced. Accordingly, a likelihood that the user is provided with the desired response and/or that a live agent is not required to interact with the user to provide the user with the desired response may be reduced. Accordingly, costs and/or manual effort associated with providing the user with the desired response may be reduced.

FIGS. 1A-1G illustrate examples of a system 101 for determining an intention of a message and/or performing one or more operations based upon the intention. FIG. 1A illustrates a messaging interface 106 displayed via a first client device 100 (e.g., a phone, a laptop, a computer, a wearable device, a smart device, a television, user equipment (UE), any other type of computing device, hardware, etc.). The messaging interface 106 (e.g., a chatbot messaging interface 106) may be used for receiving one or more messages input via the first client device 100 (e.g., the one or more messages may be input by a first user of the first client device 100). A message may be input by the first user by typing the message into the messaging interface 106 using a keyboard (e.g., at least one of a physical keyboard, a touchscreen keyboard, etc.). Alternatively and/or additionally, a voice recognition system may be used to convert audible speech recorded by the first client device 100 into a set of text. In an example, communication over the messaging interface 106 may be performed using a computer communications protocol (e.g., Websocket and/or other protocol) that provides one or more communication channels (e.g., full-duplex communication channels and/or other types of communication channels) over a connection (e.g., a Transmission Control Protocol (TCP) connection and/or other type of connection). In some examples, in response to detecting text input via the messaging interface 106, one or more messages may be suggested (e.g., auto-suggested) via the messaging interface 106 (e.g., the one or more messages may be determined via one or more predictive text techniques, and/or a message of the one or more messages may be selected via the messaging interface 106). In response to receiving a message input via the messaging interface 106, an intention determination system may be used to determine an intention of the message input. The intention determination system may be part of a chatbot (also known as chatterbot) system comprising a communication system (e.g., a conversational system) configured to generate a response to the message based upon the determined intention, wherein the response may be displayed via the messaging interface 106. For example, the chatbot system (e.g., the intention determination system and/or the communication system) may be used to conduct a conversation (e.g., a chat conversation) with the first user via the messaging interface 106. The chatbot system may be used to provide one or more services to the first user, such as one or more services requested in the one or more messages received from the first client device 100 via the messaging interface 106.

In an example, in FIG. 1A, a first message 102 generated by the chatbot system (e.g., generated by the communication system) may be transmitted to the first client device 100 and/or displayed via the messaging interface 106 (e.g., the first message 102 may be displayed as a starting message of a conversation between the first user and the chatbot system). A second message, comprising a first set of text 104, may be received from the first client device 100 via the messaging interface 106. The first set of text 104 may correspond to a request for a service, such as a request for information, a request for an action to be performed, etc. In the example shown in FIG. 1A, the first set of text 104 comprises "Help me to pay my bill" and corresponds to a request for assistance in paying a bill. In an example, the bill may correspond to a phone bill of the first user with a telecommunication service provider, wherein the chatbot system is configured to provide users with services related to the telecommunication service provider, such as providing information associated with different service plans to assist a user in choosing a service plan, subscribing a user to a chosen service plan, activating and/or deactivating one or more features of a service plan, paying a bill associated with a service plan, etc. In some examples, the chatbot system may be configured to provide users with other types of services, such as services related to at least one of an airline (e.g., the chatbot system may be used to at least one of book and/or cancel flights with the airline, choose seats on a flight, provide information associated with a flight, etc.), a shopping website (e.g., the chatbot system may be used to at least one of facilitate a purchase of a product, provide inventory information associated with a product, provide shipping information, etc.), etc.

Figure 1B:
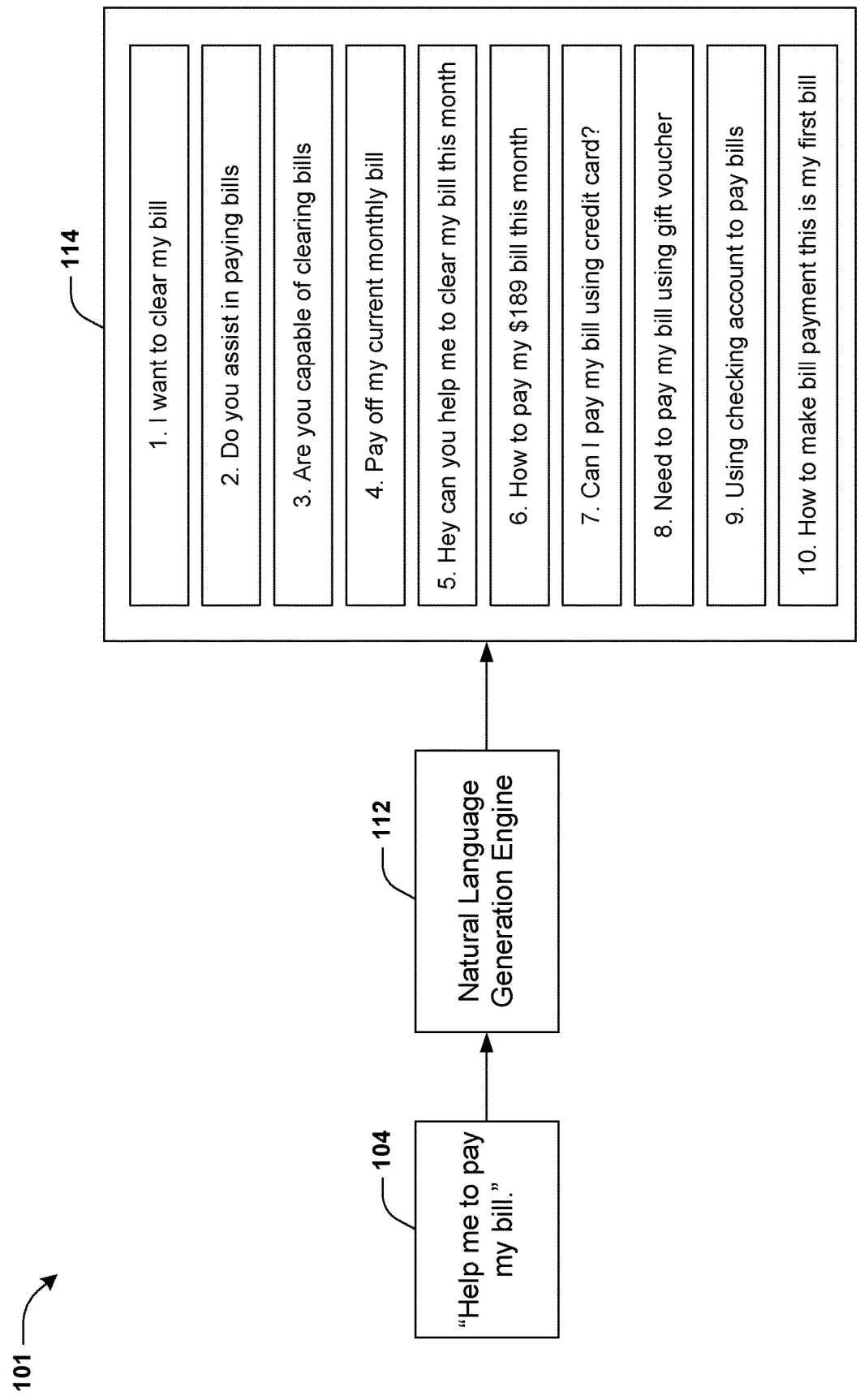
FIG. 1B is a diagram illustrating an example system for determining an intention of a message and/or performing one or more operations based upon the intention, where a first plurality of sets of text is determined according to some embodiments.
Figure 1C:
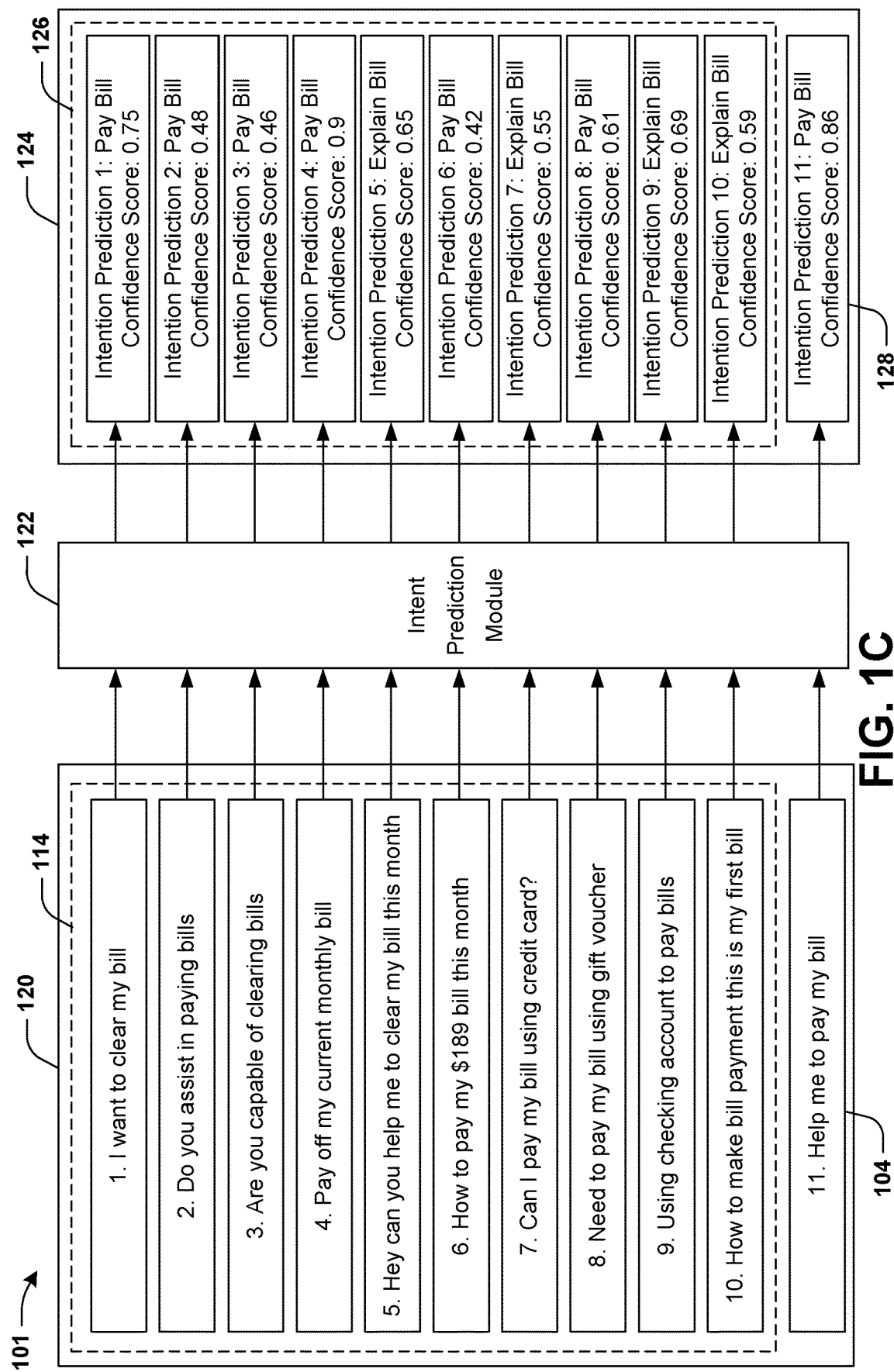
FIG. 1C is a diagram illustrating an example system for determining an intention of a message and/or performing one or more operations based upon the intention, where a first plurality of intention predictions is determined according to some embodiments.
Figure 1D:
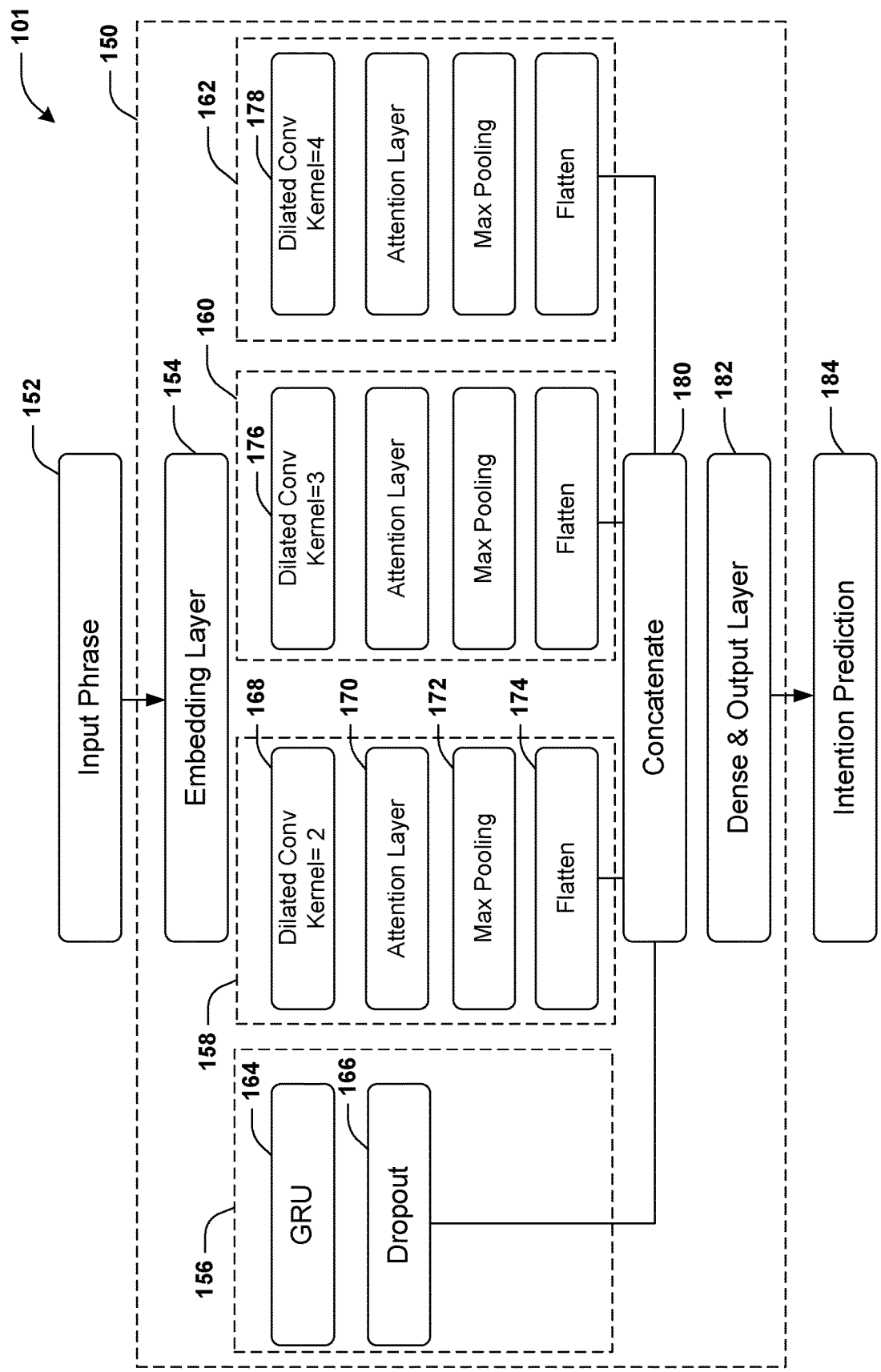
FIG. 1D is a diagram illustrating an example system for determining an intention of a message and/or performing one or more operations based upon the intention, where an intention prediction is determined using a neural network model according to some embodiments.
Figure 1E:
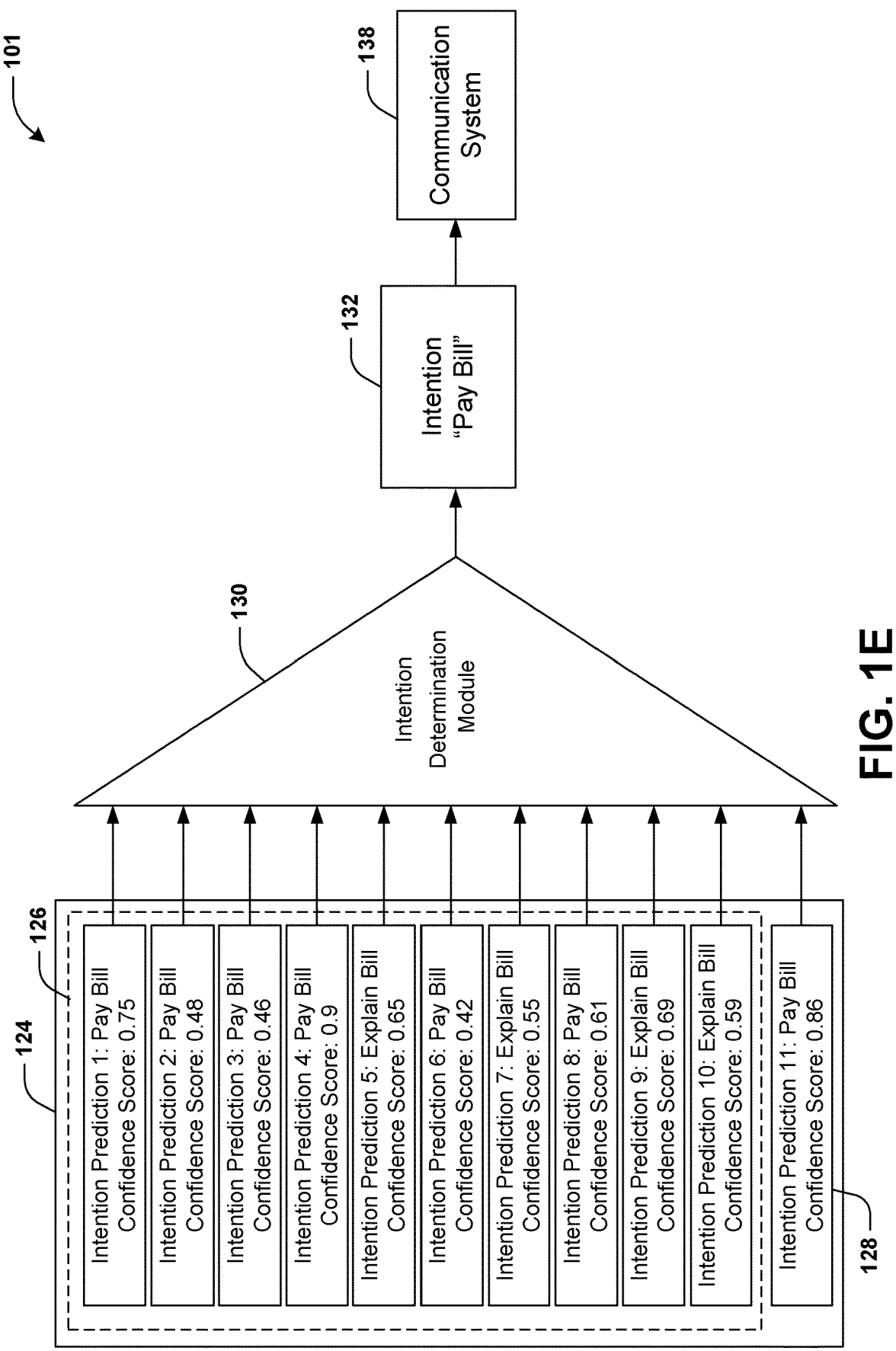
FIG. 1E is a diagram illustrating an example system for determining an intention of a message and/or performing one or more operations based upon the intention, where a first intention is determined according to some embodiments.
Figure 1F:
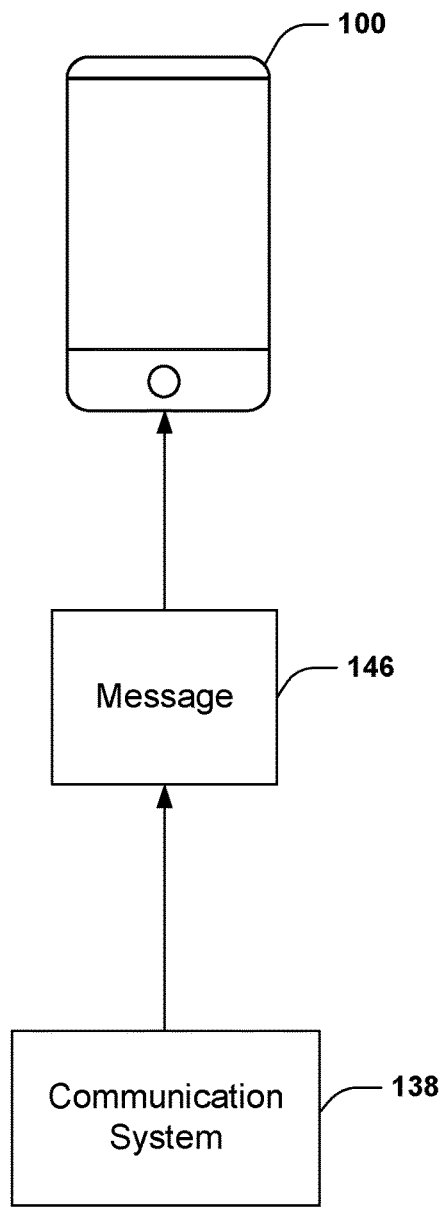
FIG. 1F is a diagram illustrating an example system for determining an intention of a message and/or performing one or more operations based upon the intention, where a third message is transmitted by a communication system to a first client device according to some embodiments.
Figure 1G:
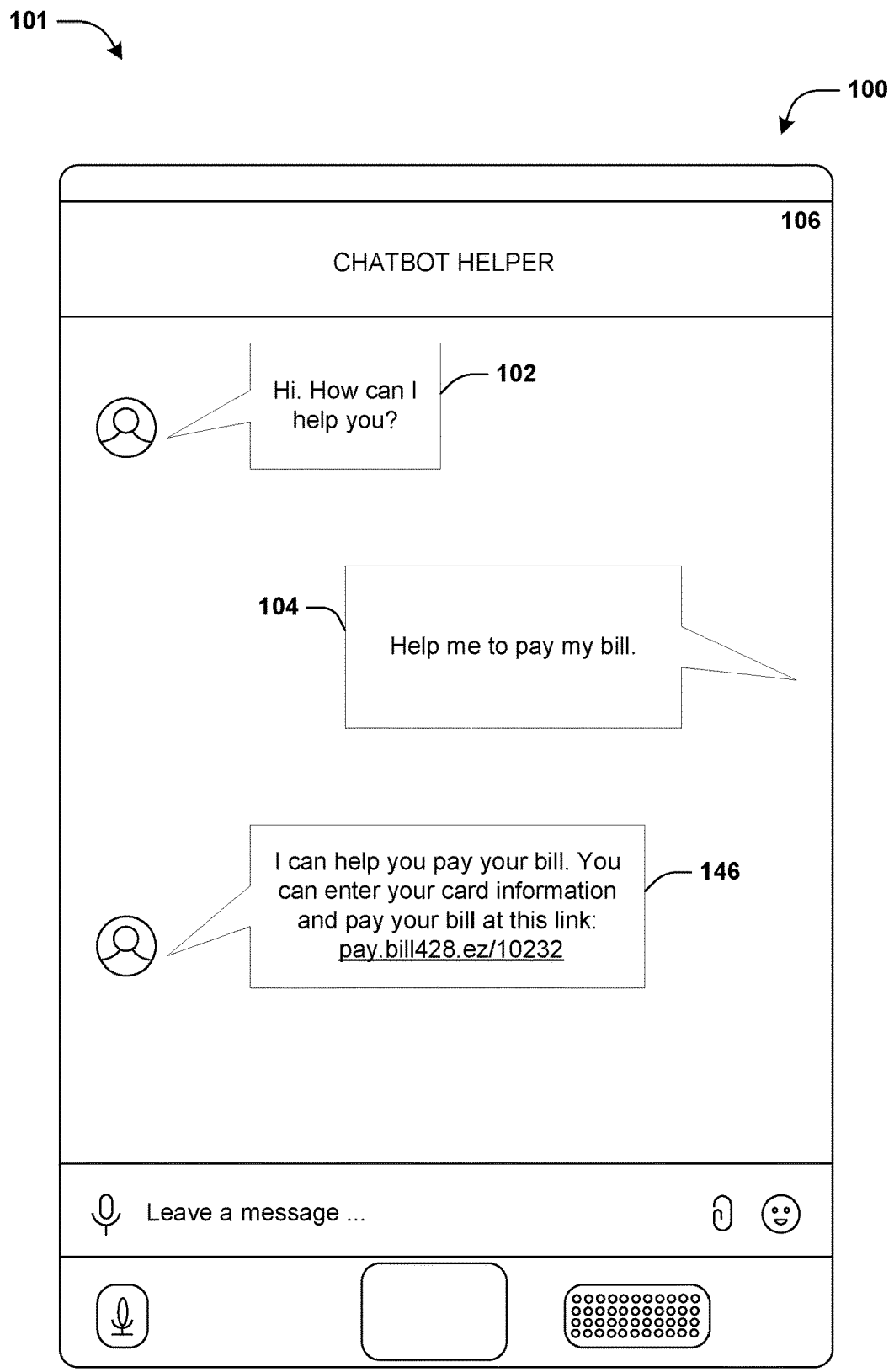
FIG. 1G is a diagram illustrating an example system for determining an intention of a message and/or performing one or more operations based upon the intention, where a third message is displayed via a messaging interface according to some embodiments.
Figure 2:
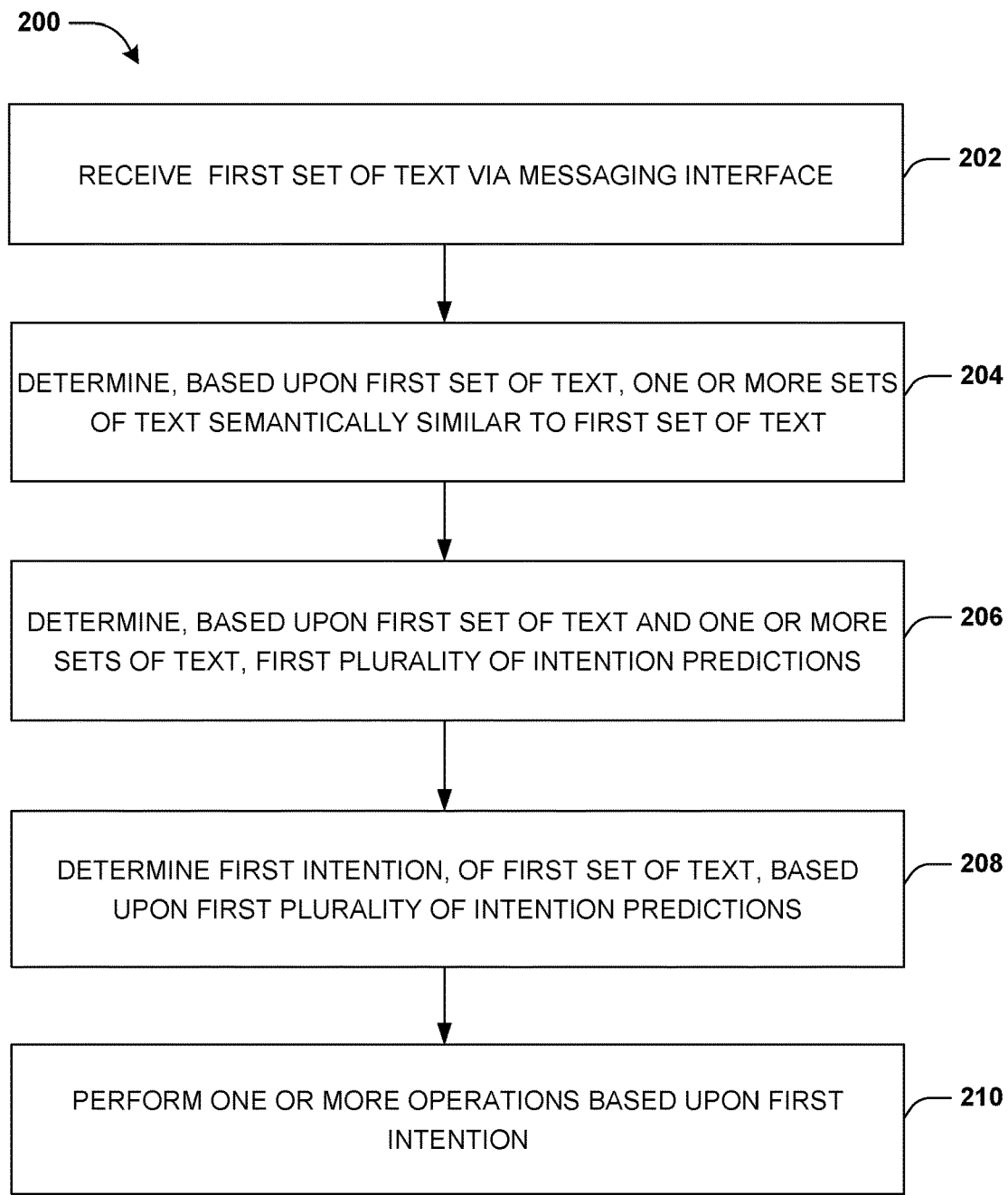
FIG. 2 is a flow chart illustrating an example method for determining an intention of a message and/or performing one or more operations based upon the intention, according to some embodiments.

An embodiment of determining an intention of a message and/or performing one or more operations based upon the intention is illustrated by an exemplary method 200 of FIG. 2, and is further described in conjunction with the system 101 of FIGS. 1A-1G. At 202, the first set of text 104 is received from the first client device 100 via the messaging interface 106. In response to receiving the first set of text 104, the intention prediction system may determine an intention associated with the first set of text 104 using one or more of the techniques provided herein.

At 204, a first plurality of sets of text, semantically similar to the first set of text 104, is determined based upon the first set of text 104. FIG. 1B illustrates determination of the first plurality of sets of text (shown with reference number 114). The first set of text 104 may be input to a natural language generation engine 112. The natural language generation engine 112 uses the first set of text 104 to generate the first plurality of sets of text 114 semantically similar to the first set of text 104. Herein, a set of text being semantically similar to the first set of text 104 may mean that: (i) the set of text is generated, by the natural language generation engine 112, to be semantically similar (e.g., similar in meaning and/or semantic content) to the first set of text 104, (ii) a semantic similarity score representative of a semantic similarity between the set of text and the first set of text 104 meets a threshold and/or is higher than one or more other semantic similarity scores representative of semantic similarity between one or more other sets of text and the first set of text 104, and/or (iii) among semantic similarity scores associated with semantic similarity between sets of text and the first set of text 104, the semantic similarity score associated with the set of text is among k highest similarity scores of the semantic similarities, wherein k may be a defined number.

In some examples, the first plurality of sets of text 114 may be determined based upon first information. The first information may comprise at least one of historical information comprising text received from client devices, text of one or more encyclopedias, text of one or more news articles, text associated with a field associated with the messaging interface (e.g., a field associated with the chatbot system), etc.

In an example, the first information may comprise one or more first corpora (e.g., one or more field-related corpora) associated with the field. The field may correspond to an entity and/or a category associated with the chatbot system, such as an entity (e.g., at least one of a company, a business, etc.) associated with the chatbot system and/or a category associated with services (e.g., at least one of telecommunication service, transportation service, etc.) that are provided and/or facilitated by the chatbot system and/or the entity (e.g., the chatbot system may be used for providing customer service for services associated with the category). A corpus of the one or more first corpora may comprise text (e.g., structured sets of text) comprising at least one of definitions of terms associated with the field, usage of terms associated with the field, etc. For example, the text of the corpus may comprise at least one of text from articles (e.g., news articles, encyclopedia articles, etc.) related to the category and/or the entity, text from social media posts and/or blogs related to the category and/or the entity, text from documentation (e.g., datasheets, product and/or service specifications, etc.) related to the category and/or the entity, text from webpages related to the category and/or the entity, a glossary and/or dictionary of terms related to the category and/or the entity, etc. In an example, a processor may be used to read memory on which content associated with the field (e.g., at least one of articles, social media posts, blogs, documentation, webpages, a glossary, a dictionary, etc.) is stored and/or the processor may be used to extract text from the content and/or store the text in a data store on which the one or more first corpora are stored.

In an example in which the entity is a telecommunication service provider and/or the category is telecommunication services, the corpus of the one or more first corpora may comprise text comprising at least one of definitions of terms associated with the telecommunication service provider and/or telecommunication services, usage of terms associated with the telecommunication service and/or telecommunication services (e.g., usage of the terms in sentences, paragraphs and/or phrases), etc. The corpus may comprise text from at least one of one or more articles, one or more social media posts, one or more blogs, documentation, one or more webpages, one or more glossaries, one or more dictionaries, etc. related to the telecommunication service provider and/or telecommunication services.

In an example, the first information may comprise one or more second corpora (e.g., one or more general-language context corpora). Text of the one or more second corpora may not be specific to the field. The one or more second corpora may comprise at least one of articles (e.g., news articles, encyclopedia articles, etc.), social media posts and/or blogs, webpages, a glossary, a dictionary, etc. In an example, the one or more second corpora may comprise at least one of an online encyclopedia corpus, a news language corpus, etc. The one or more second corpora may comprise text comprising usage of a language (e.g., English) in general language context and/or not specific to the field associated with the one or more first corpora. In an example, a processor may be used to read memory on which content (e.g., general language content, such as at least one of articles, social media posts, blogs, documentation, webpages, a glossary, a dictionary, etc.) is stored and/or the processor may be used to extract text from the content and/or store the text in a data store on which the one or more second corpora are stored.

In some examples, the historical information may comprise sets of text of messages received (by the chatbot system, for example) from client devices via messaging interfaces (e.g., messaging interfaces associated with the chatbot system, such as the messaging interface 106). For example, the historical information may be indicative of interactions of users with messaging interfaces and/or the chatbot system. For example, the historical information may comprise text (e.g., user-input text) of conversations between the chatbot system and different users. In an example, a processor may be used to read memory on which sets of text received from client devices are stored and/or the processor may be used to extract the sets of text and/or store the sets of text in a data store on which the historical information is stored. Alternatively and/or additionally, the processor may be used to track received sets of text (from client devices) and/or store the sets of text in the data store.

In some examples, the natural language generation engine 112 determines the first plurality of sets of text 114 using a first machine learning model. In an example, the first machine learning model comprises a neural network model (e.g., a deep neural network model), such as neural network model comprising a recurrent neural network. Alternatively and/or additionally, the first machine learning model may comprise at least one of a tree-based model, a machine learning model used to perform linear regression, a machine learning model used to perform logistic regression, a decision tree model, a support vector machine (SVM), a Bayesian network model, a k-Nearest Neighbors (kNN) model, a K-Means model, a random forest model, a machine learning model used to perform dimensional reduction, a machine learning model used to perform gradient boosting, etc. A machine learning model may be trained using first training information to generate the first machine learning model. The first machine learning model may be loaded into the natural language generation engine 112 to be used for generating sets of text (e.g., sets of text that are semantically similar to text input to the natural language generation engine 112). In an example, the first training information may comprise the first information.

In some examples, based upon the one or more first corpora associated with the field and/or the one or more second corpora (e.g., one or more general-language context corpora), one or more field-related terms (e.g., terms specific to the field, such as terms that are used in the context of the field) may be identified (e.g., the one or more field-related terms may be identified from the one or more first corpora) and/or one or more relationships between the one or more field-related terms and one or more second terms (e.g., one or more terms that are not specific to the field, such as one or more terms used in general language context) may be determined (e.g. learned by the first machine learning model and/or the natural language generation engine 112). In an example, the one or more first corpora may comprise one or more indications of "Complete Phone Protection". Based upon the one or more first corpora, it may be determined (e.g., learned by the natural language generation engine 112) that "Complete Phone Protection" (one of the one or more field-related terms, for example) forms a term and/or that the term "Complete Phone Protection" refers to "phone insurance" (of the one or more second terms, for example). In an example, it may be determined (e.g., learned by the first machine learning model and/or the natural language generation engine 112) that the term "Complete Phone Protection" refers to and/or is semantically similar to "phone insurance" used in general language. In an example in which the first set of text 104 comprises the term "phone insurance", based upon determining that the term "Complete Phone Protection" refers to "phone insurance", the natural language generation engine 112 may generate a set of text (of the first plurality of sets of text 114, for example) to comprise the term "Complete Phone Protection". Alternatively and/or additionally, in an example in which the first set of text 104 comprises the term "Complete Phone Protection", the natural language generation engine 112 may generate a set of text (of the first plurality of sets of text 114, for example) to comprise the term "phone insurance".

The natural language generation engine 112 may be configured to generate sets of text that are syntactically and/or grammatically correct. For example, the first machine learning model of the natural language generation engine 112 may be trained, using the first training information, to generate sets of text that are syntactically and/or grammatically correct (e.g., the first machine learning model may be trained to generate sets of text that are syntactically and/or grammatically correct using the one or more second corpora and/or other text of the first training information). In an example, based upon the one or more second corpora (e.g., one or more general-language context corpora), one or more rules (e.g., one or more grammatical rules and/or one or more syntactical rules) may be determined (e.g., learned by the first machine learning model and/or the natural language generation engine 112). For example, the natural language generation engine 112 may generate sets of text (of the first plurality of sets of text 114, for example) based upon the one or more rules (and/or the one or more second corpora) such that the sets of text are grammatically correct and/or syntactically correct.

The natural language generation engine 112 may be configured to generate sets of text that have different styles (based upon the historical information, for example). For example, the first machine learning model of the natural language generation engine 112 may be trained, using the first training information (e.g., the historical information of the first training information), to generate sets of text with different styles. The historical information may comprise historical sets of text (e.g., messages, such as inquiries and/or statements, previously received by the chatbot system) with different styles associated with different users (e.g., historical sets of text that are phrased by different users in different ways). In an example, based upon the historical information (e.g., based upon historical sets of text that are phrased differently by different users), the natural language generation engine 112 may generate sets of text (of the first plurality of sets of text 114, for example) with different styles (e.g., sets of text phrased in different ways) based upon different styles of sets of text of the historical sets of text. For example, the natural language generation engine 112 may generate a set of text with a first style based upon one or more first historical sets of text of the historical information (e.g., the one or more first historical sets of text may have the first style), a set of text with a second style based upon one or more second historical sets of text of the historical information (e.g., the one or more second historical sets of text may have the second style), etc. For example, the first style and/or the second style may be associated with at least one of different sentence structures, different phrases, different terminology, different types of sentences (e.g., at least one of exclamatory sentence type, negative sentence type, interrogative sentence type, positive sentence type, optative sentence type, etc.), etc. used in different historical sets of text of the historical information. In the example shown in FIG. 1B, sets of text of the first plurality of sets of text 114 have different styles (e.g., are phrased differently from each other), such as based upon different styles exhibited by different historical sets of text of the historical information (and/or based upon different styles exhibited by other text of the first information, such as at least one of the one or more first corpora, the one or more second corpora, etc.).

In some examples, a processor may be used to read memory on which the first set of text 104 and/or memory on which the first information is stored and/or the processor may be used to generate the first plurality of sets of text 114 based upon the first set of text 104 and/or the first information.

In some examples, the first plurality of sets of text 114 may be selected (e.g., selected for use in determining an intention of the first set of text 104) from a second plurality of sets of text. The second plurality of sets of text is determined, by the natural language generation engine 112, based upon the first set of text 104. For example, the first plurality of sets of text 114 may correspond to a subset of the second plurality of sets of text determined based upon the first set of text 104. The second plurality of sets of text may be determined using one or more of the techniques provided herein with respect to determining the first plurality of sets of text 114.

The first plurality of sets of text 114 may be selected from the second plurality of sets of text based upon a plurality of similarity scores associated with the second plurality of sets of text. A similarity score of the plurality of similarity scores may correspond to a measure of similarity (e.g., a measure of semantic similarity, such as a measure of closeness in meaning and/or semantic content) between the first set of text 104 and a set of text of the second plurality of sets of text. In an example, the plurality of similarity scores may comprise a first similarity score corresponding to a measure of similarity between the first set of text 104 and a second set of text of the second plurality of sets of text, a second similarity score corresponding to a measure of similarity between the first set of text 104 and a third set of text of the second plurality of sets of text, etc.

In some examples, the first set of text 104 may be compared with the second set of text (of the second plurality of sets of text) to determine the first similarity score, the first set of text 104 may be compared with the third set of text (of the second plurality of sets of text) to determine the second similarity score, etc.

In an example, the first similarity score may be determined based upon a measure (e.g., quantity) of terms (e.g., phrases and/or words), of the second set of text, that match terms of the first set of text 104. A term of the second set of text may be determined to match a term of the first set of text 104 based upon at least one of a determination that the terms are related, a determination that the terms have the same or similar meaning, etc.

Alternatively and/or additionally, the plurality of similarity scores may be determined based upon a first representation associated with the first set of text 104 and a plurality of representations associated with the second plurality of sets of text. In an example, the first representation may comprise an embedding based representation (e.g., an embedding) of the first set of text 104 and/or a vector representation of the first set of text 104. Alternatively and/or additionally, a representation of the plurality of representations (and/or each representation of the plurality of representations) may comprise an embedding based representation (e.g., an embedding) and/or a vector representation. The plurality of representations may comprise a second representation generated based upon the second set of text, a third representation generated based upon a third set of text, etc. In an example, the second representation may correspond to a representation (e.g., an embedding based representation and/or a vector representation) of the second set of text. In some examples, the first representation and/or the plurality of representations may be generated using a natural language processing (NLP) model.

A similarity score of the plurality of similarity scores (and/or each similarity score of the plurality of similarity scores) may be generated based the first representation associated with the first set of text 104 and a representation, of the plurality of representations, associated with a set of text of the second plurality of sets of text. In an example, one or more operations (e.g., mathematical operations) may be performed using the first representation and the second representation to determine the first similarity score (e.g., the first similarity score may be based upon (and/or may be equal to) a measure of similarity between the first representation and the second representation, such as a cosine similarity between the first representation and the second representation). In some examples, other similarity scores of the plurality of similarity scores (other than the first similarity score) may be determined using one or more of the techniques provided herein with respect to determining the first similarity score.

The first plurality of sets of text 114 may be selected from the second plurality of sets of text based upon the plurality of similarity scores. In some examples, the first plurality of sets of text 114 may be selected from the second plurality of sets of text based upon a determination that the first plurality of sets of text 114 are associated with highest similarity scores of the plurality of similarity scores. Alternatively and/or additionally, the first plurality of sets of text 114 may be selected from the second plurality of sets of text based upon a determination that the first plurality of sets of text 114 are associated with k highest similarity scores of the plurality of similarity scores (e.g., sets of text associated with the k highest similarity scores of the plurality of similarity scores may be included in the first plurality of sets of text 114), wherein k may be a defined number. In an example where k is 10 (such as shown in FIG. 1B where the first plurality of sets of text 114 is shown to comprise 10 sets of text), 10 sets of text associated with 10 highest similarity scores of the plurality of similarity scores may be selected and/or included in the first plurality of sets of text 114. In an example where k is one, merely one set of text associated with a single highest similarity score of the plurality of similarity scores may be selected (e.g., the first plurality of sets of text 114 may be replaced with one set of text).

Alternatively and/or additionally, the second plurality of sets of text may be ranked based upon the plurality of similarity scores (e.g., a set of text associated with a higher similarity score of the plurality of similarity scores is ranked higher than a set of text associated with a lower similarity score of the plurality of similarity scores), and/or the top k ranked sets of text may be selected from among the second plurality of sets of text (e.g., the top k ranked sets of text may be included in the first plurality of sets of text 114). Alternatively and/or additionally, the first plurality of sets of text 114 may be selected from the second plurality of sets of text based upon a determination that the first plurality of sets of text 114 are associated with similarity scores (of the plurality of similarity scores) that meet (e.g., are equal to or exceed) a first threshold similarity score (e.g., sets of text that are associated with similarity scores, of the plurality of similarity scores, that do not meet the first threshold similarity score, may not be included in the first plurality of sets of text 114). In an example, the first threshold similarity score may be 80 percent semantically similar (or other value).

At 206, a first plurality of intention predictions may be determined based upon the first set of text 104 and the first plurality of sets of text 114. FIG. 1C illustrates determination of the first plurality of intention predictions (shown with reference number 124). A third plurality of sets of text 120, comprising the first set of text 104 and the first plurality of sets of text 114, may be input to an intention prediction module 122. The intention prediction module 122 uses the third plurality of sets of text 120 to determine the first plurality of intention predictions 124. In an example, for each set of text of the third plurality of sets of text 120, the intention prediction module 122 determines an intention prediction associated with the set of text. An intention prediction of the first plurality of intention predictions 124 (and/or each intention prediction of the first plurality of intention predictions 124) is determined based upon a set of text of the third plurality of sets of text 120. For example, the first plurality of intention predictions 124 may comprise a first intention prediction 128 based upon the first set of text 104 and/or a second plurality of intention predictions 126 based upon the first plurality of sets of text 114. For example, each intention prediction of the first plurality of intention predictions 124 may be determined, using the intention prediction module 122, based upon a set of text of the third plurality of sets of text 120 (e.g., the intention prediction module 122 may determine the first intention prediction 128 based upon the first set of text 104, the intention prediction module 122 may determine an intention prediction "Intention Prediction 1" of the first plurality of intention predictions 124 based upon a set of text "I want to clear my bill" of the first plurality of sets of text 114, the intention prediction module 122 may determine an intention prediction "Intention Prediction 2" of the first plurality of intention predictions 124 based upon a set of text "Do you assist in paying bills" of the first plurality of sets of text 114, etc.).

In some examples, an intention prediction of the first plurality of intention predictions 124 (and/or each intention of the first plurality of intention predictions 124) comprises an indication of an intention (e.g., an intention of a set of text based upon which the intention prediction is determined). For example, the intention indicated by the intention prediction corresponds to an intention of a set of text of the third plurality of sets of text 120. In an example, the first intention prediction 128 may comprise an indication of an intention of the first set of text 104. The intention of the first set of text 104 may correspond to a purpose and/or goal, of a user (e.g., the first user), for inputting (e.g., typing) and/or sending the first set of text 104. In the example shown in FIG. 1C, the intention of the first set of text 104 is determined to be "Pay Bill" (e.g., it is determined that a purpose and/or goal for inputting and/or sending the first set of text 104 is to be provided with assistance for paying a bill). In another example, as shown in "Intention Prediction 7" in FIG. 1C, an intention of a set of text "Can I pay my bill using credit card?" is determined to be "Explain Bill" (e.g., it is determined that a purpose and/or goal for inputting and/or sending the set of text "Can I pay my bill using credit card?" is to be provided with an explanation of a bill).

In some examples, an intention prediction of the first plurality of intention predictions 124 (and/or each intention of the first plurality of intention predictions 124) comprises a confidence score associated with the intention prediction. For example, the confidence score may correspond to a probability (e.g., likelihood) that the intention prediction is correct. In an example, the confidence score may be generated to be within a range (e.g., a range from 0 to 1). In the example shown in FIG. 1C, the first intention prediction 128 indicates a confidence score of 0.86. In an example in which the confidence score is generated to be within a range from 0 to 1, the confidence score of 0.86 may indicate that a probability (e.g., likelihood) that the determined intention (e.g., "Pay Bill") of the first set of text 104 is correct is 86%.

In some examples, the first plurality of intention predictions 124 may be determined based upon second information. The second information may comprise text intention information. The text intention information may comprise sets of text (e.g., sentences, phrases, etc.) and indications of intentions of the sets of text. For example, the text intention information may comprise labeled data, wherein a set of text of the text intention information (and/or each set of text of the text intention information) is labeled with a classification of an intention associated with the set of text. In an example, for each intention of a plurality of intentions associated with the chatbot system, the text intention information may comprise one or more sets of text (e.g., one or more sentences, phrases, etc.) that are classified as being associated with the intention.

In some examples, the intention prediction module 122 determines the first plurality of intention predictions 124 using a second machine learning model. In an example, the second machine learning model comprises a neural network model (e.g., a deep neural network model), such as neural network model comprising a recurrent neural network. The neural network model may use Gated Recurrent Unit (GRU) and/or Long Short-Term Memory (LSTM). Alternatively and/or additionally, the second machine learning model may comprise at least one of a tree-based model, a machine learning model used to perform linear regression, a machine learning model used to perform logistic regression, a decision tree model, a SVM, a Bayesian network model, a kNN model, a K-Means model, a random forest model, a machine learning model used to perform dimensional reduction, a machine learning model used to perform gradient boosting, etc. A machine learning model may be trained using second training information to generate the second machine learning model. The second machine learning model may be loaded into the intention prediction module 122 to be used for determining intention prediction (e.g., intention predictions of sets of text input to the intention prediction module 122). In an example, the second training information may comprise the second information (e.g., the text intention information). Accordingly, using the text intention information, the second machine learning model may learn classifications (e.g., intention) of various sets of text of the text intention information (e.g., the second machine learning model may learn which phrases and/or sentences correspond to which intentions).

FIG. 1D illustrates an example network architecture of the neural network model (shown with reference number 150) of the second machine learning model. An input set of text 152 (e.g., a set of text of the third plurality of sets of text 120) is input to the neural network model 150. The neural network model 150 comprises an embedding layer 154 configured to generate a representation of the input set of text 152. In an example, the representation comprises an embedding based representation (e.g., an embedding) of the input set of text 152, such as a multi-dimension vector representation of the input set of text 152. In an example, the representation may comprise 764 dimensions (or other quantity of representations) and/or the representation may be a 764-bit vector array (or other type of vector array). The representation may be input to and/or passed through a plurality of network subsets (e.g., a plurality of parallel columns of layers). Each network subset of the plurality of network subsets may comprise one or more layers. In an example, the plurality of network subsets may comprise a first network subset 156, a second network subset 158, a third network subset 160 and/or a fourth network subset 160. Although four network subsets are shown in FIG. 1D, it may be appreciated that the neural network model 150 may comprise any number of network subsets used for determining an intention prediction.

Different network subsets of the plurality of network subsets may be used to capture different patterns in the representation (and/or the input set of text 152). The different patterns may correspond to different types of relationships (e.g., a semantic relationship, a syntactic relationship, relationships associated with sets of 2 words, relationships associated with sets of 3 words, etc.). It may be appreciated that using the plurality of network subsets (as opposed to using merely a single network subset, for example) may result in more accurate prediction of an intention of the input set of text 152 as a result of the plurality of network subsets capturing different patterns and/or different types of relationships.

In some examples, the first network subset 156 may comprise a GRU 164 (e.g., a GRU with short-term memory) and/or a dropout layer 166. An output of the GRU 164 may be input to the dropout layer 166, wherein the dropout layer 166 may be configured to remove and/or turn off a proportion (e.g., 50% or other proportion) of neural units in the neural network model 150. In some examples, an output of the dropout layer 166 is input to a concatenate layer 180.

In some examples, the second network subset 158, the third network subset 160 and/or the fourth network subset 162 may comprise dilated convolution layers 168, 176, and/or 178, respectively, with different kernel sizes. In an example, a first dilated convolution layer 168 of the second network subset 158 may have a kernel size of 2, a second dilated convolution layer 176 of the third network subset 160 may have a kernel size of 3 and/or a third dilated convolution layer 178 of the fourth network subset 162 may have a kernel size of 4. In an example in which the first dilated convolution layer 168 has a kernel size of 2, the second network subset 158 may capture a pattern associated with one or more sets of 2 words of the input set of text 152 (e.g., each set of 2 words of the one or more sets of 2 words may comprise 2 contiguous words in the input set of text 152). In an example in which the second dilated convolution layer 176 has a kernel size of 3, the third network subset 160 may capture a pattern associated with one or more sets of 3 words of the input set of text 152 (e.g., each set of 3 words of the one or more sets of 3 words may comprise 3 contiguous words in the input set of text 152). In an example in which the third dilated convolution layer 178 has a kernel size of 4, the fourth network subset 162 may capture a pattern associated with one or more sets of 4 words of the input set of text 152 (e.g., each set of 4 words of the one or more sets of 4 words may comprise 4 contiguous words in the input set of text 152).

In some examples, an output of the first dilated convolution layer 168 may be input to a first attention layer 170 of the first network subset 158. The first attention layer 170 may enhance and/or increase a weight of one or more first parts of the output of the first dilated convolution layer 168. The first attention layer 170 may diminish and/or decrease a weight of one or more second parts of the output of the first dilated convolution layer 168. Accordingly, the one or more first parts may be given more weight in determining an intention prediction than the one or more second parts. In some examples, the first attention layer 170 may enhance and/or increase the weight of the one or more first parts based upon a determination that the one or more first parts are more relevant to determining the intention prediction than the one or more second parts. Alternatively and/or additionally, the first attention layer 170 may enhance and/or increase the weight of the one or more first parts based upon a determination that the one or more first parts are associated with one or more words (e.g., one or more content words) that are relevant to determining the intention prediction. Alternatively and/or additionally, the first attention layer 170 may diminish and/or decrease the weight of the one or more second parts may be based upon a determination that the one or more second parts are associated with one or more words (e.g., one or more stop words) that are not relevant (and/or less relevant than the one or more content words) to determining the intention prediction. In some examples, an output of the first attention layer 170 may be input to a maximum pooling layer 172. The maximum pooling layer 172 may be configured to reduce dimensions of the output of the first attention layer 170 to generate information with a smaller number of dimensions as compared to the output of the first attention layer 170. In some examples, an output of the maximum pooling layer 172 (e.g., the information with the smaller number of dimensions as compared to the output of the first attention layer 170) may be input to a flatten layer 174. The flatten layer may be configured to convert the output of the maximum pooling layer 172 to a 1-dimensional array.

In some examples, the third network subset 160 and/or the fourth network subset 162 may comprise an attention layer, a maximum pooling layer and/or a flatten layer and/or may be implemented using one or more of the techniques discussed herein with respect to the second network subset 158.

It may be appreciated that using different kernel sizes for different dilated convolution layers of the plurality of network subsets may result in more accurately determining an intention of the input set of text 152 as a result of analyzing words of the input set of text 152 in different contexts. For example, an entity (e.g., New York) of a set of text comprising "New York" may be determined using a set of 2 words "New York", whereas the entity of the set of text may not be determined based upon an individual word "New" and/or an individual word "York". Alternatively and/or additionally, in an example in which "Complete Phone Protection" refers to phone insurance, an entity (e.g., phone insurance) of a set of text comprising "Complete Phone Protection" may be determined using a set of 3 words "Complete Phone Protection", whereas the entity of the set of text may not be determined based upon a set of 2 words "Complete Phone".

In some examples, outputs of the plurality of network subsets are input to a concatenate layer 180. The concatenate layer 180 may be configured to concatenate the outputs of the plurality of network subsets to generate an output (e.g., the outputs may comprise a concatenation of the outputs of the plurality of network subsets). The output of the concatenate layer 180 may be input to a dense and output layer 182. In an example, the dense and output layer 182 may comprise a dense layer and/or an output layer. In some examples, the dense layer and/or the output layer output a plurality of intention probabilities associated with a plurality of intentions associated with the chatbot system. For example, each intention probability may be indicative of a probability that an intention of the plurality of intentions is the intention of the input set of text 152. In an example, an intention prediction 184 may be determined based upon the plurality of intention probabilities. For example, the intention prediction 184 may be determined by: (i) determining a maximum probability of the plurality of intention probabilities (e.g., an argmax function may be applied to the plurality of intention probabilities to determine the maximum probability), and/or (ii) determining an intention, of the plurality of intentions, associated with the maximum probability. In an example, the intention prediction 184 may comprise an indication of the intention and/or an indication of a confidence score associated with the intention prediction 184 (e.g., the confidence score may be based upon, such as equal to, the maximum probability).

In an example, the plurality of intention probabilities may comprise values {0.1, 0.5, 0.01, 0.09, 0.3} associated with the plurality of intentions {intention A, intention B, intention C, intention D, intention E}. The maximum probability may be determined to be 0.5 (e.g., 0.5 is the highest value among the plurality of intention probabilities. It may be determined that the maximum probability (e.g., 0.5) is associated with intention B of the plurality of intentions. Accordingly, the intention prediction 184 may be indicative of intention B and/or may be indicative of a confidence score based upon the maximum probability (e.g., the confidence score may be equal to the maximum probability, such as equal to 0.5).

The intention prediction module 122 may be configured to determine intention predictions based upon sets of text input to the intention prediction module 122. For example, the second machine learning model of the intention prediction module 122 may be trained, using the second training information (e.g., the text intention information), to determine intention predictions of sets of text input to the second machine learning model.

In some examples, the text intention information may comprise sets of text and/or classifications (e.g., intention classifications) that are manually curated. Alternatively and/or additionally, the text intention information may comprise sets of text and/or classifications that are based upon using previous user interactions with the chatbot system (e.g., the previous user interactions may correspond to previously received messages and/or intentions associated with the previously received messages). Accordingly, supplementing the text intention information with additional text intention information to increase an accuracy of the intention prediction module 122 and/or the second machine learning model may require at least one of manual effort (e.g., manually curating sets of text and/or classifications associated with the sets of text), user interactions with the chatbot system (e.g., in an example in which the text intention information is based upon previous user interactions with the chatbot system, supplementing the text intention information with additional text intention information may require waiting for a sufficient amount of user interactions with the chatbot system which may take a significant amount of time), etc. Accordingly, using one or more of the techniques provided herein to determine an intention of an input set of text received via the messaging interface 106 may provide for increased accuracy of the intention without requiring additional text intention information, thereby providing for at least one of increased accuracy of intention determination, less manual effort, less training data (e.g., less text intention information), etc.

At 208, a first intention of the first set of text 104 is determined based upon the first plurality of intention predictions 124. FIG. 1E illustrates determination of the first intention (shown with reference number 132). The first plurality of intention predictions 124 may be input to an intention determination module 130. The intention determination module 130 uses the first plurality of intention predictions 124 to determine the first intention 132.

In some examples, the intention determination module 130 determines one or more intention prediction counts associated with one or more intentions (e.g., one or more intentions that are each indicated by one or more intention predictions of the first plurality of intention predictions 124). Each intention prediction count of the one or more intention prediction counts indicates a quantity of intention predictions, of the first plurality of intention predictions 124, that are indicative of an intention of the one or more intentions. In the example shown in FIG. 1E, the one or more intentions may comprise the first intention 132 "Pay Bill" and/or a second intention "Explain Bill". The one or more intention prediction counts comprise a first intention prediction count associated with the first intention 132 "Pay Bill" and/or a second intention prediction count associated with the second intention "Explain Bill". The first intention prediction count is 7 based upon 7 intention predictions, of the first plurality of intention predictions 124, being indicative of the first intention 132 "Pay Bill". The second intention prediction count is 4 based upon 4 intention predictions, of the first plurality of intention predictions 124, being indicative of the second intention "Explain Bill".

In some examples, the intention determination module 130 applies majority voting to determine the first intention 132. For example, the intention determination module 130 may output the first intention 132 based upon a determination that a majority of intention predictions (e.g., over 50% of intention predictions), of the first plurality of intention predictions 124, indicate the first intention 132. In the example shown in FIG. 1E, the first plurality of intention predictions 124 comprises 11 intention predictions, where the intention determination module 130 may output the first intention 132 based upon a determination that the first intention prediction count associated with the first intention 132 is at least 6.

In some examples, the intention determination module 130 may output the first intention 132 based upon a determination that the first intention prediction count is the highest intention prediction count of the one or more intention prediction counts (and/or a determination that the first intention prediction count is not equal to another intention prediction count of the one or more intention prediction counts). Accordingly, if the first intention prediction count is the highest intention prediction count (and if there is no other intention prediction count of the one or more intention prediction counts that is equal to the first intention prediction count) the intention determination module 130 may output the first intention 132 (even if the first intention prediction count does not correspond to a majority of the first plurality of intention predictions 124, for example).

In some examples, the intention determination module 130 may output the first intention 132 based upon confidence scores indicated by the plurality of intention predictions 124. In an example, the intention determination module 130 determines one or more intention prediction scores associated with the one or more intentions indicated by the first plurality of intention predictions 124. Each intention prediction score of the one or more intention prediction scores is based upon at least one of an intention prediction count (of the one or more intention prediction counts) associated with an intention, one or more confidence scores associated with the intention (e.g., one or more confidence scores indicated by intention predictions that are indicative of the intention), etc. In the example shown in FIG. 1E, the one or more intention prediction scores comprise a first intention prediction score associated with the first intention 132 "Pay Bill" and/or a second intention prediction score associated with the second intention "Explain Bill". The first intention prediction score is based upon the first intention prediction count (e.g., 7) and/or first confidence scores of first intention predictions, of the first plurality of intention predictions 124, that are indicative of the first intention 132 "Pay Bill". The second intention prediction score is based upon the second intention prediction count (e.g., 4) and/or second confidence scores of second intention predictions of the first plurality of intention predictions 124, that are indicative of the second intention "Explain Bill". In an example, the first confidence scores may comprise 0.75 of Intention Prediction 1, 0.48 of Intention Prediction 2, 0.46 of Intention Prediction 3, 0.9 of Intention Prediction 4, 0.42 of Intention Prediction 6, 0.61 of Intention Prediction 8, and/or 0.86 of Intention Prediction 11 (the first intention prediction 128). An intention prediction score of the one or more intention prediction scores may be determined based upon (e.g., the intention prediction score may be equal to) a combination (e.g., a sum, an average, etc.) of confidence scores associated with an intention. For example, the first score may be determined based upon (e.g., the first score may be equal to) a combination of the first confidence scores, such as an average of the first confidence scores and/or a sum of the first confidence scores.

In some examples, confidence scores indicated by the plurality of intention predictions 124 may be used for determining an intention (e.g., the first intention 132) if (e.g., only if) a condition is met. The condition may be met if there is no majority intention of the first plurality of intention predictions 124 (such as where the one or more intention prediction counts do not comprise an intention prediction count that corresponds to a majority of the first plurality of intention predictions 124). Alternatively and/or additionally, the condition may be met if, among the one or more intention prediction counts, there are multiple intention prediction counts that are tied highest (e.g., the one or more intention counts comprise at least two intention prediction counts that are equal to each other, wherein the one or more intention counts does not comprise another intention prediction count that is higher than the at least two intention prediction counts).

In an example, in response to determining that the condition is not met, the intention determination module 130 may output the first intention 132 without determining the one or more intention prediction scores based upon confidence scores indicated by the plurality of intention predictions 124 (e.g., the intention determination module 130 may output the first intention 132 based upon a determination that the first intention prediction count is the highest intention prediction count of the one or more intention prediction counts and/or based upon a determination that the first intention prediction count corresponds to a majority of the first plurality of intention predictions 124).

In an example in which multiple intention prediction counts associated with multiple intentions are equal to each other (and the multiple intention prediction counts are the highest intention prediction counts of the one or more intention prediction counts), intention prediction scores associated with the multiple intentions may be determined (based upon confidence scores associated with the multiple intentions). The intention prediction scores may be compared to determine which intention to output (e.g., the first intention 132 may be output based upon a determination that the first intention prediction score is the highest intention prediction score of the intention prediction scores).

In an example in which the one or more intention prediction scores are used for determining an intention (e.g., the first intention 132), the intention determination module 130 may output the intention based upon a determination that an intention prediction score associated with the intention is the highest intention prediction score of the one or more intention prediction scores.

In some examples, the intention determination module 130 outputs the determined intention (e.g., the first intention 132) to the communication system (shown with reference number 138 in FIG. 1E).

At 210, one or more first operations are performed based upon the first intention 132 (e.g., the determined intention output by the intention determination module 130).

In an example, intention operation information may be analyzed to determine the one or more first operations (e.g., the one or more operations to be performed in response to receiving the first set of text 104). The intention operation information may comprise a plurality of sets of instructions associated with a plurality of intentions. For example, a set of instructions of the plurality of sets of instructions (and/or each set of instructions of the plurality of sets of instructions) may be associated with an intention of the plurality of intentions. In an example, the intention operation information may comprise a first set of instructions (of the plurality of sets of instructions) associated with the first intention 132 (e.g., the intention operation information may indicate that one or more operations shall be performed according to the first set of instructions in response to receiving a set of text determined to be associated with the first intention 132), a second set of instructions (of the plurality of sets of instructions) associated with the second intention, etc. The intention operation information may be analyzed based upon the first intention 132 to identify the first set of instructions associated with the first intention 132. In response to identifying the first set of instructions, the one or more first operations may be performed in accordance with the first set of instructions.

In an example, the first intention 132 corresponds to a request for information. For example, the first intention 132 may correspond to at least one of a request for a price of a product, a request for availability of a flight, a request for a quote of one or more services, etc. The one or more first operations comprise transmitting the information (e.g., the requested information) to the first client device 100 and/or displaying the information via the messaging interface 106.

In an example, a type of information of the information may be determined based upon the first intention 132. Alternatively and/or additionally, identification information associated with the information may be determined based upon the first set of text 104 (and/or other information received from the first client device 100). The information may be determined based upon the type of information and/or the identification information. For example, data may be analyzed based upon the type of information and/or the identification information to identify and/or determine the information (e.g., memory on which the information is stored may be read using a processor based upon the identification information to identify availability information of the flight, and/or the availability may be determined based upon the availability information). In an example in which the information is the availability of a flight (e.g., the first intention is a request for availability of a flight), the identification information may correspond to flight identification information of the flight, such as a flight number of the flight, a date of the flight and/or an indication of a departure location and/or arrival location of the flight. Based upon the type of information (e.g., flight availability) and/or the identification information (e.g., the flight identification information), flight data may be analyzed to check for availability of the flight (e.g., memory on which the flight data is stored may be read using a processor based upon the flight identification information to identify availability information of the flight, and/or the availability may be determined based upon the availability information). It may be appreciated that using one or more of the techniques herein may result in higher accuracy of the determined intention, and thus, may provide for a higher accuracy of the information transmitted to the first client device 100 and/or a higher likelihood that the transmitted information is the correct information requested by the first user.

In an example, the first intention 132 corresponds to a request to perform an action. It may be appreciated that using one or more of the techniques herein may result in higher accuracy of the determined intention, and thus, may provide for a higher accuracy of the action performed in response to the first set of text 104 and/or a higher likelihood that the performed action is the correct action requested by the first user.

In an example, the first intention 132 may correspond to a request to perform a purchase of a product. For example, the first set of text 104 (and/or other information received from the first client device 100) may be indicative of the product. The one or more first operations may comprise performing a purchase of the product. In an example, the purchase may be performed (e.g., automatically performed in response to determining the first intention 132) using payment information and/or shipping information associated with the first user (e.g., the payment information and/or the shipping information may be previously entered by the first user and/or may be linked to a user account of the first user).

In an example, the first intention 132 may correspond to a request to reserve a seat on a flight. For example, the first set of text 104 (and/or other information received from the first client device 100) may be indicative of flight information (e.g., a flight number and/or a date) of the flight. The one or more first operations may comprise performing a purchase of a flight reservation. In an example, the purchase of the flight reservation may be performed (e.g., automatically performed in response to determining the first intention 132) using payment information associated with the first user (e.g., the payment information may be previously entered by the first user and/or may be linked to a user account of the first user).

In an example, the first intention 132 may correspond to a request for one or more accommodations of a reserved ticket. For example, the first set of text 104 (and/or other information received from the first client device 100) may be indicative of ticket information (e.g., a ticket number) of the reserved ticket. The one or more first operations may comprise transmitting a notification indicative of the one or more accommodations (e.g., a vegetarian meal, one or more handicapped services, etc.) and/or the ticket information to an accommodations system associated with facilitating accommodations for passengers.

In some examples, in response to determining the first intention 132 (e.g., the determined intention output by the intention determination module 130), it may be determined that additional information is required to at least one of perform a requested action, provide requested information, etc. (e.g., the additional information may be used to perform the requested action and/or provide the requested information). For example, the additional information may comprise user identification information (based upon which user account information associated with a user account of the first user may be identified) and/or other identification information. In an example in which the first intention 132 corresponds to a request for one or more accommodations of a reserved ticket, the additional information may comprise ticket information of the reserved ticket and/or user identification information of the first user. In an example in which the first intention 132 corresponds to a request to perform a purchase of a product, the additional information may comprise at least one of payment information associated with the purchase, shipping information associated with the purchase, user account information of a user account linked to the payment information and/or the shipping information, etc. In some examples, in response to determining that the additional information is required, an information request message, identifying the additional information, may be transmitted to the first client device 100 and/or displayed via the messaging interface 106 (e.g., the information request message may comprise "In order to book these accommodations for your flight, please provide your ticket number"). For example, the first user may learn which information is required, and/or may provide the additional information based upon the information request message. In an example, the requested action may be performed and/or the requested information may be provided using the additional information.

FIGS. 1F-1G illustrates the one or more first operations according to an example in which the first intention 132 is Pay Bill (e.g., the first intention 132 is a request for assistance in paying a bill of the first user). The communication system 138 may generate a third message based upon the first intention 132. In an example, the third message may comprise a link to a payment web page for paying the bill. FIG. 1F illustrates the third message (shown with reference number 146) transmitted by the communication system 138 to the first client device 100. FIG. 1G illustrates the third message 146 displayed via the messaging interface 106. In an example, in response to a selection of the link, the first client device 100 may navigate to the payment web page and/or the payment of the bill may be completed via the payment web page.

In another example, in response to determining the first intention 132, the payment of the bill may be performed (e.g., automatically performed in response to determining the first intention 132) using payment information associated with the first user (e.g., the payment information and/or the shipping information may be previously entered by the first user and/or may be linked to a user account of the first user). In the example, the third message 146 may comprise a confirmation message indicating that the bill has been paid and/or indicating an amount paid.

In some examples, at least some of the present disclosure may be performed and/or implemented automatically and/or in real time. For example, at least some of the present disclosure may be performed and/or implemented such that communication between the first user and the chatbot system is performed quickly (e.g., instantly) and/or in real time. In an example, at least some operations provided herein (e.g., at least one of determining the first plurality of sets of text 114, determining the first plurality of intention predictions 124, determining the first intention 132 of the first set of text 104, determining the one or more first operations to be performed, performing the one or more first operations, etc.) may be performed automatically and/or in real time in response to (e.g., upon) reception of the first set of text 104 via the messaging interface 106. In some examples at least some of the operations may be performed using the first client device 100 (e.g., a processor of the first client device 100 may perform at least some of the operations using a program installed on the first client device 100). Alternatively and/or additionally, at least some of the operations may be performed using a computer (e.g., a server).

Implementation of at least some of the disclosed subject matter may lead to benefits including, but not limited to, more accurate and/or appropriate response to a message received from a client device, wherein the response (e.g., transmission of information to the client device and/or performance of an action) has a higher probability of being desired and/or intended by a user of the client device. Alternatively and/or additionally, implementation of at least some of the disclosed subject matter may lead to benefits including a reduction in screen space and/or an improved usability of a display (e.g., of the client device) (e.g., as a result of the higher probability of the response being desired by the user, wherein the user may not need to open a separate application and/or a separate window in achieve the desired response and/or the user may not need to communicate with a live agent to achieve the desired response).

According to some embodiments, a method is provided. The method includes receiving, from a client device, a first set of text via a messaging interface; determining, based upon the first set of text, one or more sets of text semantically similar to the first set of text; determining, based upon the first set of text and the one or more sets of text, a plurality of intention predictions including a first intention prediction based upon the first set of text, and one or more second intention predictions generated based upon the one or more sets of text, wherein a second intention prediction of the one or more second intention predictions is generated based upon a second set of text of the one or more sets of text; determining a first intention, of the first set of text, based upon the plurality of intention predictions; and performing one or more operations based upon the first intention.

According to some embodiments, determining the one or more sets of text includes determining, based upon the first set of text, a plurality of sets of text; determining, based upon the first set of text and the plurality of sets of text, a plurality of similarity scores associated with the plurality of sets of text, wherein each similarity score of the plurality of similarity scores corresponds to a measure of semantic similarity between the first set of text and a set of text of the plurality of sets of text; and selecting, based upon the plurality of similarity scores, the one or more sets of text from the plurality of sets of text.

According to some embodiments, selecting the one or more sets of text from the plurality of sets of text is performed based upon a determination that similarity scores, of the plurality of similarity scores, associated with the one or more sets of text meet a threshold similarity score.

According to some embodiments, a quantity of sets of text of the one or more sets of text is a defined number k; and selecting the one or more sets of text from the plurality of sets of text is performed based upon a determination that the one or more sets of text are associated with k highest similarity scores of the plurality of similarity scores.

According to some embodiments, determining the one or more sets of text is performed based upon information including historical information including text received from client devices, text of an encyclopedia, text of news articles and/or text associated with a field associated with the messaging interface.

According to some embodiments, determining the one or more sets of text is performed using a first machine learning model.

According to some embodiments, the method includes training a machine learning model using training information to generate the first machine learning model, wherein the training information includes historical information including text received from client devices, text of an encyclopedia, text of news articles and/or text associated with a field associated with the messaging interface.

According to some embodiments, each intention prediction of the plurality of intention predictions includes an indication of an intention and a confidence score associated with the intention prediction.

According to some embodiments, each intention prediction of the plurality of intention predictions includes an indication of an intention; the method includes determining one or more intention prediction counts associated with one or more intentions including the first intention; each intention prediction count of the one or more intention prediction counts indicates a quantity of one or more intention predictions, of the plurality of intention predictions, indicative of an intention of the one or more intentions; and determining the first intention of the first set of text is based upon the one or more intention prediction counts.

According to some embodiments, determining the first intention of the first set of text is based upon a determination that a first intention prediction count, of the one or more intention prediction counts, associated with the first intention corresponds to a majority of the plurality of intention predictions.

According to some embodiments, determining the first intention of the first set of text is based upon a determination that a first intention prediction count, of the one or more intention prediction counts, associated with the first intention is the highest intention prediction count of the one or more intention prediction counts.

According to some embodiments, first intention predictions, of the plurality of intention predictions, are indicative of the first intention; and determining the first intention of the first set of text is based upon confidence scores of the first intention predictions.

According to some embodiments, each intention prediction of the plurality of intention predictions includes a confidence score associated with the intention prediction; first intention predictions, of the plurality of intention predictions, are indicative of the first intention; and determining the first intention of the first set of text is based upon confidence scores of the first intention predictions in response to a determination that a first intention prediction count, of the one or more intention prediction counts, associated with the first intention does not correspond to a majority of the plurality of intention predictions, and/or a determination that the first intention prediction count is equal to a second intention prediction count, of the one or more intention prediction counts, associated with a second intention of the one or more intentions.

According to some embodiments, each intention prediction of the plurality of intention predictions includes a confidence score associated with the intention prediction; the one or more intention prediction counts include a first intention prediction count associated with the first intention and a second intention prediction count associated with a second intention of the one or more intentions; the first intention prediction count is equal to the second intention prediction count; first intention predictions, of the plurality of intention predictions, are indicative of the first intention; second intention predictions, of the plurality of intention predictions, are indicative of the second intention; and determining the first intention of the first set of text includes determining a first score associated with the first intention based upon confidence scores of the first intention predictions, determining a second score associated with the second intention based upon confidence scores of the second intention predictions, and selecting the first intention based upon the first score and the second score.

According to some embodiments, the first intention corresponds to a request for information; and the one or more operations include transmitting the information to the client device.

According to some embodiments, the first intention corresponds to a request to perform an action; and the one or more operations include performing the action.

According to some embodiments, a non-transitory computer-readable medium, storing instructions that when executed perform operations, is provided. The operations include receiving, from a client device, a first set of text via a messaging interface; determining, based upon the first set of text, one or more sets of text semantically similar to the first set of text; determining, based upon the first set of text and the one or more sets of text, a plurality of intention predictions including a first intention prediction based upon the first set of text, and one or more second intention predictions generated based upon the one or more sets of text, wherein a second intention prediction of the one or more second intention predictions is generated based upon a second set of text of the one or more sets of text; determining a first intention, of the first set of text, based upon the plurality of intention predictions; and performing one or more operations based upon the first intention.

According to some embodiments, determining the one or more sets of text includes determining, based upon the first set of text, a plurality of sets of text; determining, based upon the first set of text and the plurality of sets of text, a plurality of similarity scores associated with the plurality of sets of text, wherein each similarity score of the plurality of similarity scores corresponds to a measure of semantic similarity between the first set of text and a set of text of the plurality of sets of text; and selecting, based upon the plurality of similarity scores, the one or more sets of text from the plurality of sets of text.

According to some embodiments, a device is provided. The device includes a processor coupled to memory, the processor configured to execute instructions to perform operations. The operations include receiving, from a client device, a first set of text via a messaging interface; determining, based upon the first set of text, one or more sets of text semantically similar to the first set of text; determining, based upon the first set of text and the one or more sets of text, a plurality of intention predictions including a first intention prediction based upon the first set of text, and one or more second intention predictions generated based upon the one or more sets of text, wherein a second intention prediction of the one or more second intention predictions is generated based upon a second set of text of the one or more sets of text; determining a first intention, of the first set of text, based upon the plurality of intention predictions; and performing one or more operations based upon the first intention.

According to some embodiments, determining the one or more sets of text includes determining, based upon the first set of text, a plurality of sets of text; determining, based upon the first set of text and the plurality of sets of text, a plurality of similarity scores associated with the plurality of sets of text, wherein each similarity score of the plurality of similarity scores corresponds to a measure of semantic similarity between the first set of text and a set of text of the plurality of sets of text; and selecting, based upon the plurality of similarity scores, the one or more sets of text from the plurality of sets of text.

Figure 3:
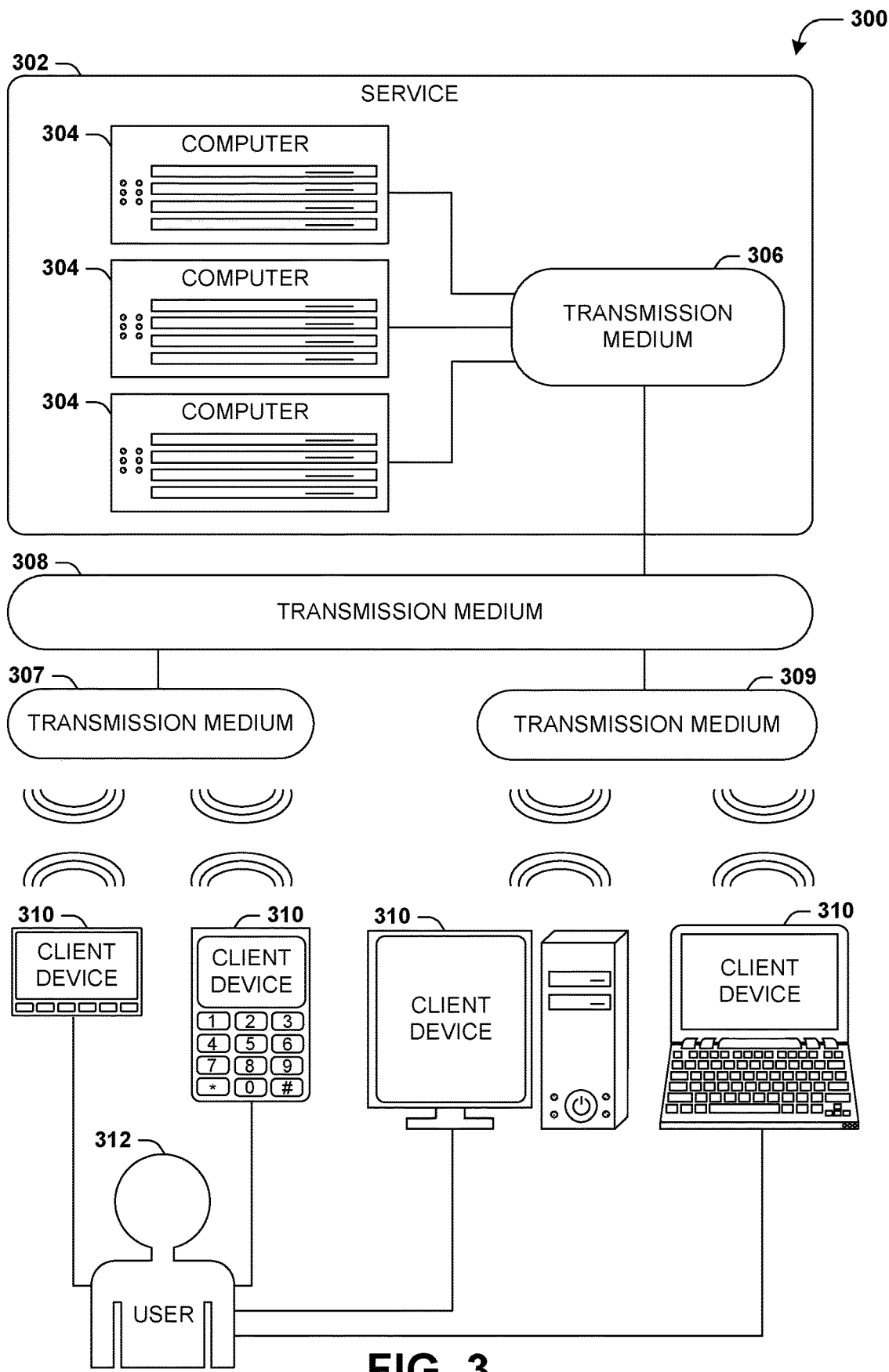
FIG. 3 is an illustration of a scenario involving various examples of transmission mediums that may be used to communicatively couple computers and clients.

FIG. 3 is an interaction diagram of a scenario 300 illustrating a service 302 provided by a set of computers 304 to a set of client devices 310 (e.g., UEs) via various types of transmission mediums. The computers 304 and/or client devices 310 may be capable of transmitting, receiving, processing, and/or storing many types of signals, such as in memory as physical memory states.

The computers 304 of the service 302 may be communicatively coupled together, such as for exchange of communications using a transmission medium 306. The transmission medium 306 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 302.

Likewise, the transmission medium 306 may comprise one or more sub-networks, such as may employ different architectures, may be compliant or compatible with differing protocols and/or may interoperate within the transmission medium 306. Additionally, various types of transmission medium 306 may be interconnected (e.g., a router may provide a link between otherwise separate and independent transmission medium 306).

In scenario 300 of FIG. 3, the transmission medium 306 of the service 302 is connected to a transmission medium 308 that allows the service 302 to exchange data with other services 302 and/or client devices 310. The transmission medium 308 may encompass various combinations of devices with varying levels of distribution and exposure, such as a public wide-area network and/or a private network (e.g., a virtual private network (VPN) of a distributed enterprise).

In the scenario 300 of FIG. 3, the service 302 may be accessed via the transmission medium 308 by a user 312 of one or more client devices 310, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 310 may communicate with the service 302 via various communicative couplings to the transmission medium 308. As a first such example, one or more client devices 310 may comprise a cellular communicator and may communicate with the service 302 by connecting to the transmission medium 308 via a transmission medium 307 provided by a cellular provider. As a second such example, one or more client devices 310 may communicate with the service 302 by connecting to the transmission medium 308 via a transmission medium 309 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 304 and the client devices 310 may communicate over various types of transmission mediums.

Figure 4:
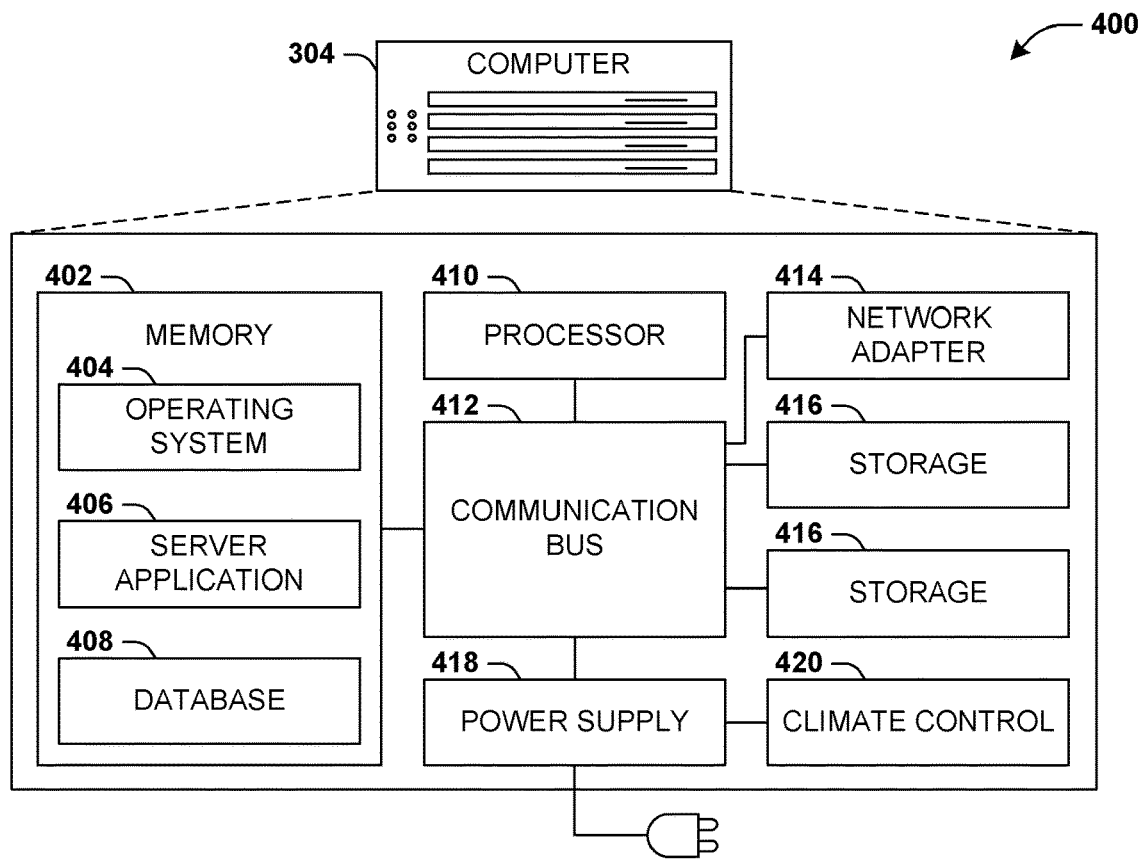
FIG. 4 is an illustration of a scenario involving an example configuration of a computer that may utilize and/or implement at least a portion of the techniques presented herein.

FIG. 4 presents a schematic architecture diagram 400 of a computer 304 that may utilize at least a portion of the techniques provided herein. Such a computer 304 may vary widely in configuration or capabilities, alone or in conjunction with other computers, in order to provide a service such as the service 302.

The computer 304 may comprise one or more processors 410 that process instructions. The one or more processors 410 may optionally include a plurality of cores; one or more coprocessors, such as a mathematics coprocessor or an integrated graphical processing unit (GPU); and/or one or more layers of local cache memory. The computer 304 may comprise memory 402 storing various forms of applications, such as an operating system 404; one or more computer applications 406; and/or various forms of data, such as a database 408 or a file system. The computer 304 may comprise a variety of peripheral components, such as a wired and/or wireless network adapter 414 connectible to a local area network and/or wide area network; one or more storage components 416, such as a hard disk drive, a solid-state storage device (SSD), a flash memory device, and/or a magnetic and/or optical disk reader.

The computer 304 may comprise a mainboard featuring one or more communication buses 412 that interconnect the processor 410, the memory 402, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 412 may interconnect the computer 304 with at least one other computer. Other components that may optionally be included with the computer 304 (though not shown in the schematic architecture diagram 400 of FIG. 4) include a display; a display adapter, such as a graphical processing unit (GPU); input peripherals, such as a keyboard and/or mouse; and a flash memory device that may store a basic input/output system (BIOS) routine that facilitates booting the computer 304 to a state of readiness.

The computer 304 may operate in various physical enclosures, such as a desktop or tower, and/or may be integrated with a display as an "all-in-one" device. The computer 304 may be mounted horizontally and/or in a cabinet or rack, and/or may simply comprise an interconnected set of components. The computer 304 may comprise a dedicated and/or shared power supply 418 that supplies and/or regulates power for the other components. The computer 304 may provide power to and/or receive power from another computer and/or other devices. The computer 304 may comprise a shared and/or dedicated climate control unit 420 that regulates climate properties, such as temperature, humidity, and/or airflow. Many such computers 304 may be configured and/or adapted to utilize at least a portion of the techniques presented herein.

Figure 5:
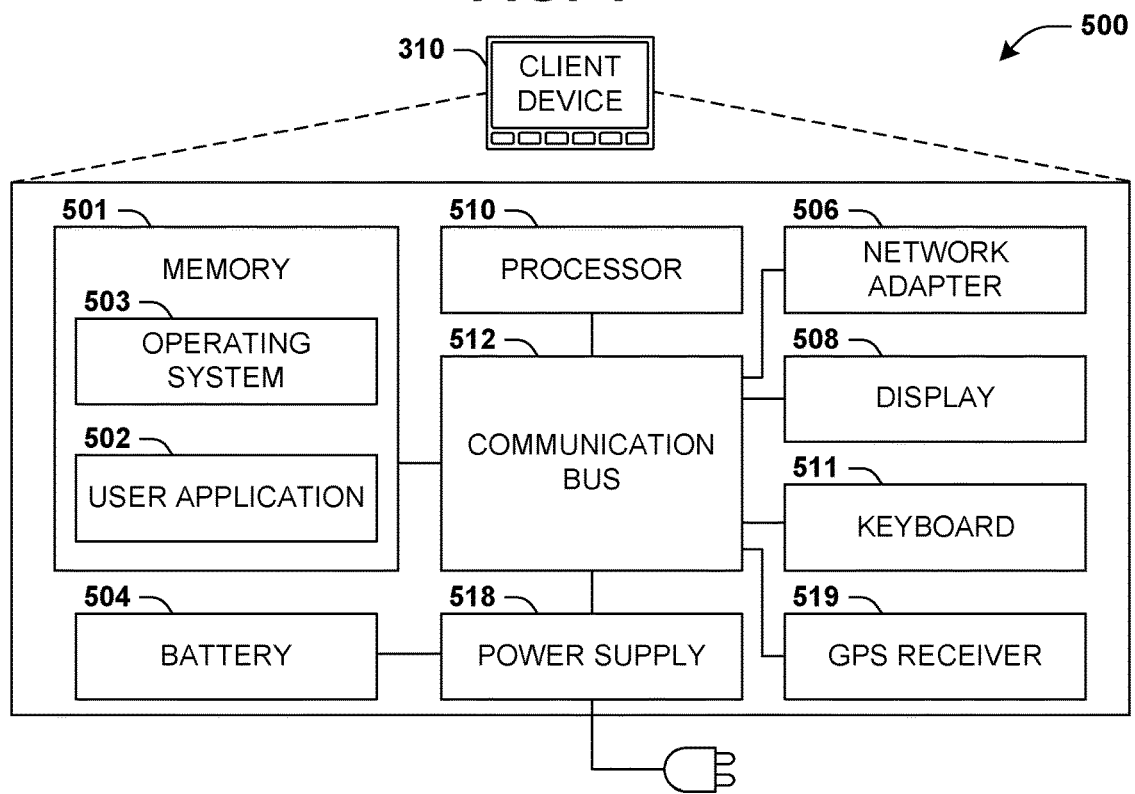
FIG. 5 is an illustration of a scenario involving an example configuration of a client that may utilize and/or implement at least a portion of the techniques presented herein.

FIG. 5 presents a schematic architecture diagram 500 of a client device 310 whereupon at least a portion of the techniques presented herein may be implemented. Such a client device 310 may vary widely in configuration or capabilities, in order to provide a variety of functionality to a user such as the user 312. The client device 310 may be provided in a variety of form factors, such as a desktop or tower workstation; an "all-in-one" device integrated with a display 508; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 310 may serve the user in a variety of roles, such as a workstation, kiosk, media player, gaming device, and/or appliance.

The client device 310 may comprise one or more processors 510 that process instructions. The one or more processors 510 may optionally include a plurality of cores; one or more coprocessors, such as a mathematics coprocessor or an integrated graphical processing unit (GPU); and/or one or more layers of local cache memory. The client device 310 may comprise memory 501 storing various forms of applications, such as an operating system 503; one or more user applications 502, such as document applications, media applications, file and/or data access applications, communication applications such as web browsers and/or email clients, utilities, and/or games; and/or drivers for various peripherals. The client device 310 may comprise a variety of peripheral components, such as a wired and/or wireless network adapter 506 connectible to a local area network and/or wide area network; one or more output components, such as a display 508 coupled with a display adapter (optionally including a graphical processing unit (GPU)), a sound adapter coupled with a speaker, and/or a printer; input devices for receiving input from the user, such as a keyboard 511, a mouse, a microphone, a camera, and/or a touch-sensitive component of the display 508; and/or environmental sensors, such as a global positioning system (GPS) receiver 519 that detects the location, velocity, and/or acceleration of the client device 310, a compass, accelerometer, and/or gyroscope that detects a physical orientation of the client device 310. Other components that may optionally be included with the client device 310 (though not shown in the schematic architecture diagram 500 of FIG. 5) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 310 to a state of readiness; and a climate control unit that regulates climate properties, such as temperature, humidity, and airflow.

The client device 310 may comprise a mainboard featuring one or more communication buses 512 that interconnect the processor 510, the memory 501, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 310 may comprise a dedicated and/or shared power supply 518 that supplies and/or regulates power for other components, and/or a battery 504 that stores power for use while the client device 310 is not connected to a power source via the power supply 518. The client device 310 may provide power to and/or receive power from other client devices.

Figure 6:
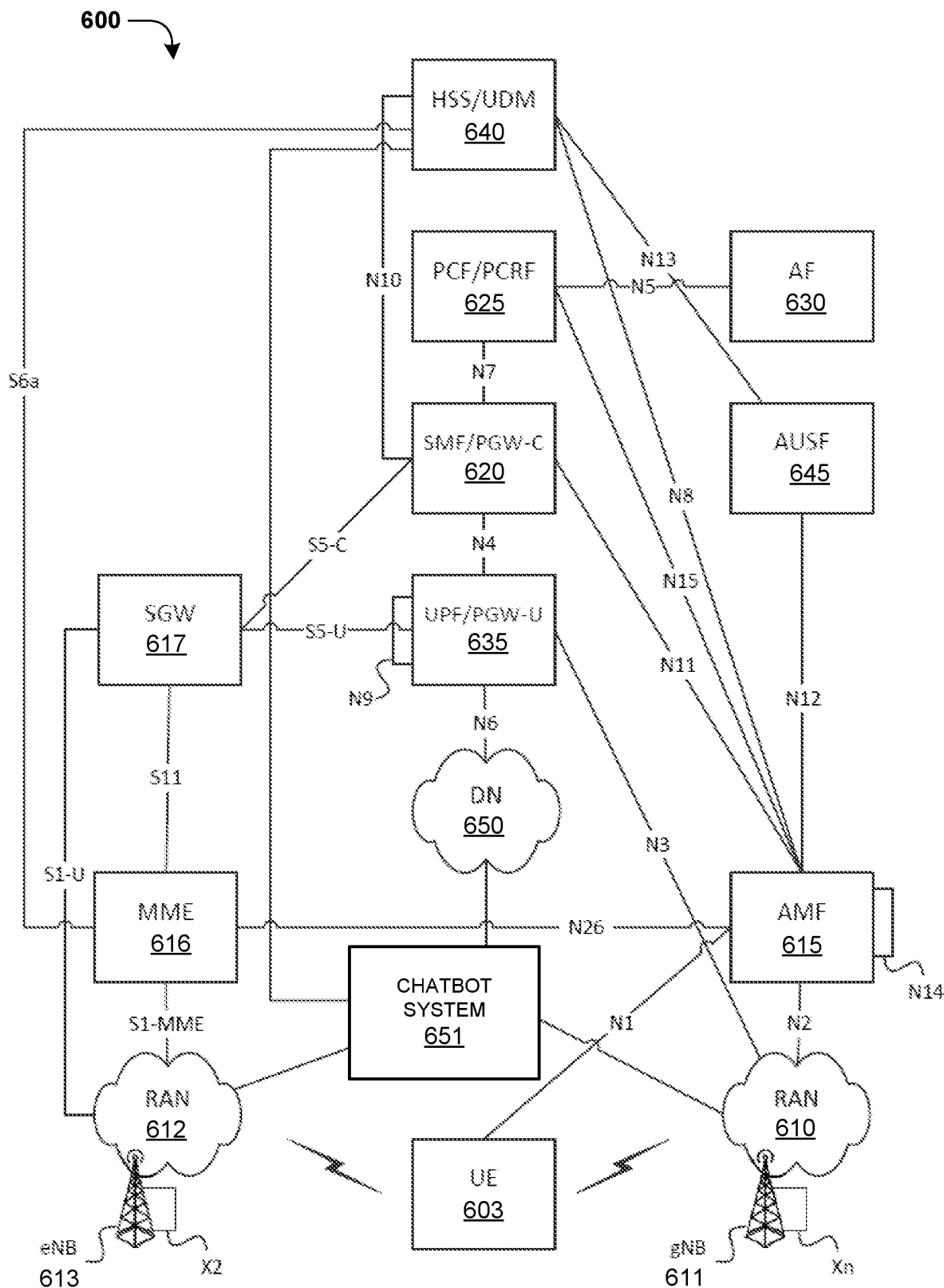
FIG. 6 is an illustration of an example environment in which at least a portion of the techniques presented herein may be utilized and/or implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 600 may include UE 603, RAN 610 (which may include one or more Next Generation Node Bs ("gNBs") 611), RAN 612 (which may include one or more one or more evolved Node Bs ("eNBs") 613), and various network functions such as Access and Mobility Management Function ("AMF") 615, Mobility Management Entity ("MME") 616, Serving Gateway ("SGW") 617, Session Management Function ("SMF")/Packet Data Network ("PDN") Gateway ("PGW")-Control plane function ("PGW-C") 620, Policy Control Function ("PCF")/Policy Charging and Rules Function ("PCRF") 625, Application Function ("AF") 630, User Plane Function ("UPF")/PGW-User plane function ("PGW-U") 635, Home Subscriber Server ("HSS")/Unified Data Management ("UDM") 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650), such as chatbot system 651.

The example shown in FIG. 6 illustrates one instance of each network component or function (e.g., one instance of SMF/PGW-C 620, PCF/PCRF 625, UPF/PGW-U 635, HSS/UDM 640, and/or 645). In practice, environment 600 may include multiple instances of such components or functions. For example, in some embodiments, environment 600 may include multiple "slices" of a core network, where each slice includes a discrete set of network functions (e.g., one slice may include a first instance of SMF/PGW-C 620, PCF/PCRF 625, UPF/PGW-U 635, HSS/UDM 640, and/or 645, while another slice may include a second instance of SMF/PGW-C 620, PCF/PCRF 625, UPF/PGW-U 635, HSS/UDM 640, and/or 645). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively and/or additionally, one or more of the devices of environment 600 may perform one or more network functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 603 may include a computation and communication device, such as a wireless mobile communication device that is capable of communicating with RAN 610, RAN 612, and/or DN 650. UE 603 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 603 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 603 may communicate with one or more other elements of environment 600. UE 603 may communicate with RAN 610 via an air interface (e.g., as provided by gNB 611). For instance, RAN 610 may receive traffic (e.g., voice call traffic, data traffic, messaging traffic, signaling traffic, etc.) from UE 603 via the air interface, and may communicate the traffic to UPF/PGW-U 635, and/or one or more other devices or networks. Similarly, RAN 610 may receive traffic intended for UE 603 (e.g., from UPF/PGW-U 635, AMF 615, and/or one or more other devices or networks) and may communicate the traffic to UE 603 via the air interface.

RAN 612 may be, or may include, a LTE RAN that includes one or more base stations (e.g., one or more eNBs 613), via which UE 603 may communicate with one or more other elements of environment 600. UE 603 may communicate with RAN 612 via an air interface (e.g., as provided by eNB 613). For instance, RAN 610 may receive traffic (e.g., voice call traffic, data traffic, messaging traffic, signaling traffic, etc.) from UE 603 via the air interface, and may communicate the traffic to UPF/PGW-U 635, and/or one or more other devices or networks. Similarly, RAN 610 may receive traffic intended for UE 603 (e.g., from UPF/PGW-U 635, SGW 617, and/or one or more other devices or networks) and may communicate the traffic to UE 603 via the air interface.

AMF 615 may include one or more devices, systems, Virtualized Network Functions ("VNFs"), etc., that perform operations to register UE 603 with the 5G network, to establish bearer channels associated with a session with UE 603, to hand off UE 603 from the 5G network to another network, to hand off UE 603 from the other network to the 5G network, manage mobility of UE 603 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, etc., that perform operations to register UE 603 with the EPC, to establish bearer channels associated with a session with UE 603, to hand off UE 603 from the EPC to another network, to hand off UE 603 from another network to the EPC, manage mobility of UE 603 between RANs 612 and/or eNBs 613, and/or to perform other operations.

SGW 617 may include one or more devices, systems, VNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, etc., that gather, process, store, and/or provide information in a manner described herein. SMF/PGW-C 620 may, for example, facilitate in the establishment of communication sessions on behalf of UE 603. In some embodiments, the establishment of communications sessions may be performed in accordance with one or more policies provided by PCF/PCRF 625.

PCF/PCRF 625 may include one or more devices, systems, VNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, etc., that receive, store, and/or provide information that may be used in determining parameters (e.g., quality of service parameters, charging parameters, or the like) for certain applications.

UPF/PGW-U 635 may include one or more devices, systems, VNFs, etc., that receive, store, and/or provide data (e.g., user plane data). For example, UPF/PGW-U 635 may receive user plane data (e.g., voice call traffic, data traffic, etc.), destined for UE 603, from DN 650, and may forward the user plane data toward UE 603 (e.g., via RAN 610, SMF/PGW-C 620, and/or one or more other devices). In some embodiments, multiple UPFs 635 may be deployed (e.g., in different geographical locations), and the delivery of content to UE 603 may be coordinated via the N9 interface (e.g., as denoted in FIG. 6 by the line marked "N9" originating and terminating at UPF/PGW-U 635). Similarly, UPF/PGW-U 635 may receive traffic from UE 603 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

HSS/UDM 640 and AUSF 645 may include one or more devices, systems, VNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 603.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 603 may communicate, through DN 650, with data servers, other UEs UE 603, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 603 may communicate.

The chatbot system 651 may include one or more devices, systems, VNFs, etc., that perform one or more operations described herein. For example, the chatbot system 651 may at least one of display one or more messages via the first client device 100 (e.g., the UE 603), receive a message from the first client device 100, determine an intention of the message using one or more of the techniques provided herein, perform one or more operations based upon the intention (e.g., generate a message based upon the intention, transmit the message to the first client device 100 and/or display the message via the first client device 100), etc.

Figure 7:
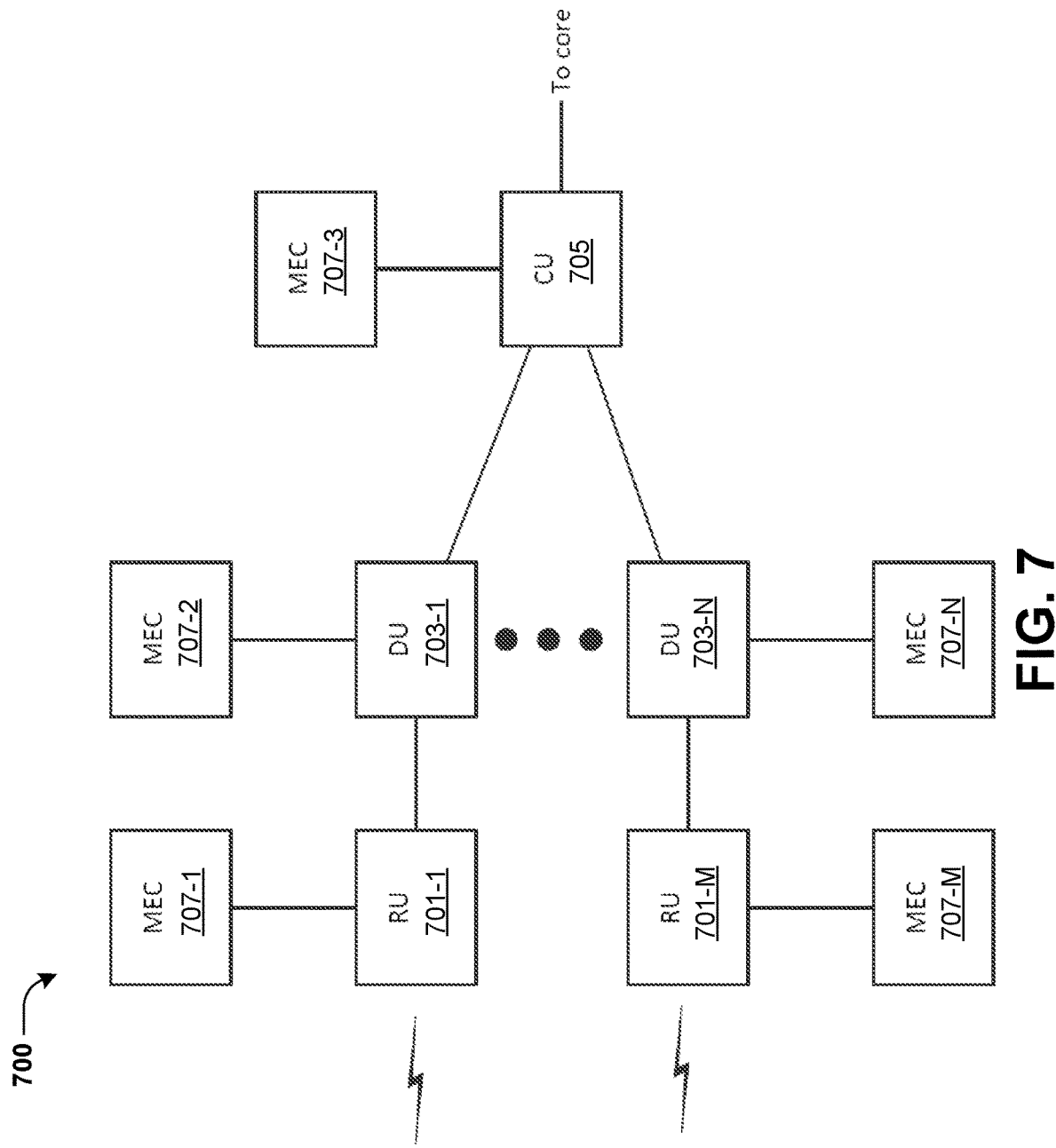
FIG. 7 is an illustration of an example network that may utilize and/or implement at least a portion of the techniques presented herein.

FIG. 7 illustrates an example Distributed Unit ("DU") network 700, which may be included in and/or implemented by one or more RANs (e.g., RAN 610, RAN 612, or some other RAN). In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNBs 611. In some embodiments, DU network 700 may correspond to one or more other types of base stations of one or more other types of RANs. As shown, DU network 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs UE 603 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based upon the RLC packets) on the traffic received from DUs 703.

In accordance with some embodiments, CU 705 may receive downlink traffic (e.g., traffic from the core network) for a particular UE 603, and may determine which DU(s) 703 should receive the downlink traffic. DU 703 may include one or more devices that transmit traffic between a core network (e.g., via CU 705) and UE 603 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 603.

RU 701 may include hardware circuitry (e.g., one or more RF transceivers, antennas, radios, and/or other suitable hardware) to communicate wirelessly (e.g., via an RF interface) with one or more UEs UE 603, one or more other DUs 703 (e.g., via RUs 701 associated with DUs 703), and/or any other suitable type of device. In the uplink direction, RU 701 may receive traffic from UE 603 and/or another DU 703 via the RF interface and may provide the traffic to DU 703. In the downlink direction, RU 701 may receive traffic from DU 703, and may provide the traffic to UE 603 and/or another DU 703.

RUs 701 may, in some embodiments, be communicatively coupled to one or more Multi-Access/Mobile Edge Computing ("MEC") devices, referred to sometimes herein simply as ("MECs") 707. For example, RU 701-1 may be communicatively coupled to MEC 707-1, RU 701-M may be communicatively coupled to MEC 707-M, DU 703-1 may be communicatively coupled to MEC 707-2, DU 703-N may be communicatively coupled to MEC 707-N, CU 705 may be communicatively coupled to MEC 707-3, and so on. MECs 707 may include hardware resources (e.g., configurable or provisionable hardware resources) that may be configured to provide services and/or otherwise process traffic to and/or from UE 603, via a respective RU 701.

For example, RU 701-1 may route some traffic, from UE 603, to MEC 707-1 instead of to a core network (e.g., via DU 703 and CU 705). MEC 707-1 may process the traffic, perform one or more computations based upon the received traffic, and may provide traffic to UE 603 via RU 701-1. In this manner, ultra-low latency services may be provided to UE 603, as traffic does not need to traverse DU 703, CU 705, and an intervening backhaul network between DU network 700 and the core network. In some embodiments, MEC 707 may include, and/or may implement some or all of the functionality described above with respect to at least one of the chatbot system 651, the first client device 100, etc.

Figure 8:
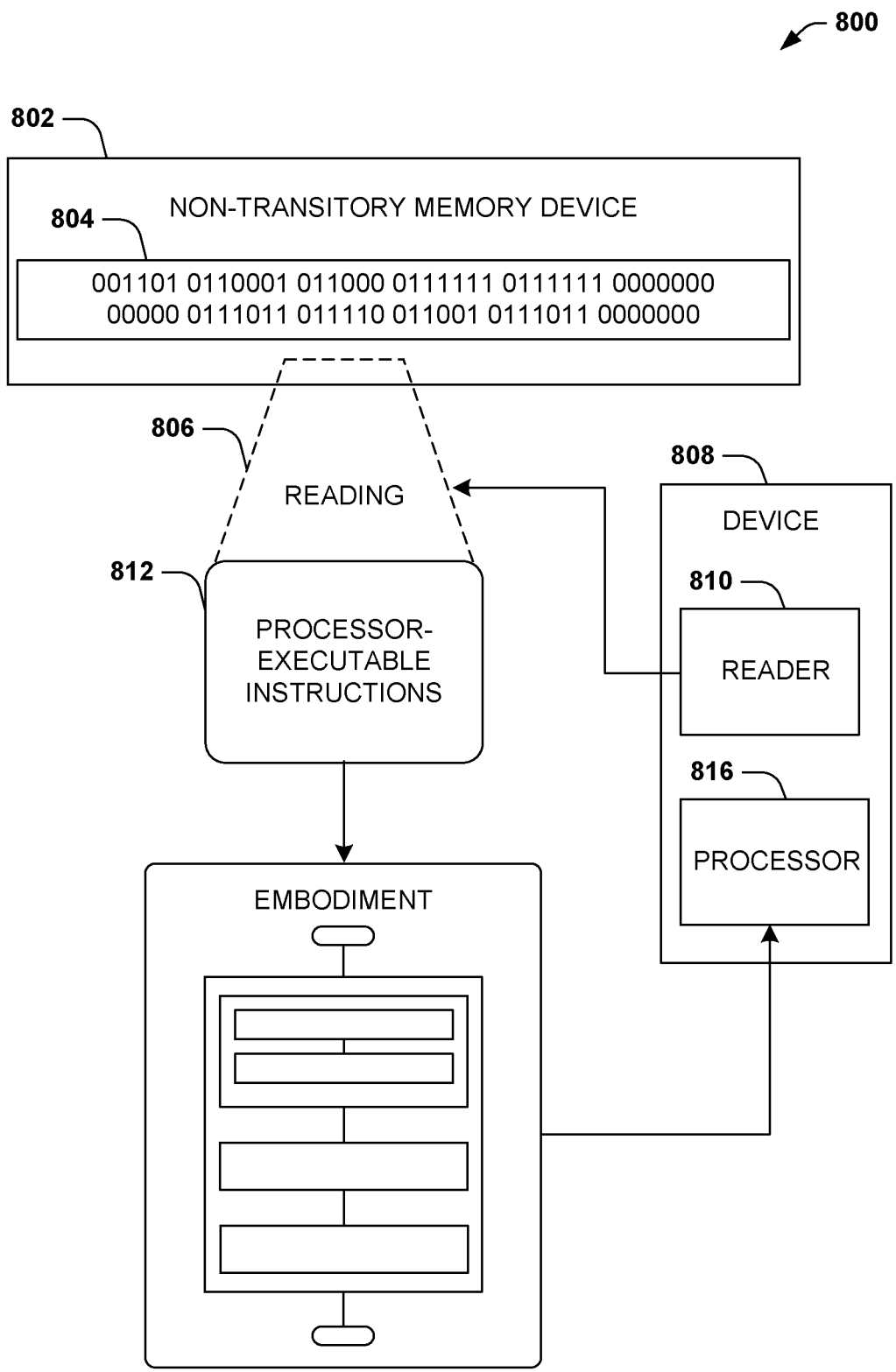
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 200 of FIG. 2, for example. In some embodiments, the processor-executable instructions 812 are configured to cause implementation of a system, such as at least some of the example system 101 of FIGS. 1A-1G, for example.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   training a machine learning model using training information to generate a trained machine learning model;
   loading the trained machine learning model into a natural language generation engine;
   receiving, from a client device, a first set of text via a messaging interface;
   determining, based upon the first set of text and using the natural language generation engine loaded with the trained machine learning model, one or more sets of text semantically similar to the first set of text;
   determining, based upon the first set of text and the one or more sets of text, a plurality of intention predictions comprising:
      a first intention prediction based upon the first set of text, wherein a first confidence score is indicative of a first probability that the first intention prediction is correct; and
      one or more second intention predictions generated based upon the one or more sets of text, wherein a second intention prediction of the one or more second intention predictions is generated based upon a second set of text of the one or more sets of text, wherein a second confidence score is indicative of a second probability that the second intention prediction is correct, wherein a third intention prediction of the one or more second intention predictions is generated based upon a third set of text of the one or more sets of text, wherein a third confidence score is indicative of a third probability that the third intention prediction is correct, wherein the second intention prediction and the third intention prediction are both indicative of a common intention;
   determining a first intention, of the first set of text, based upon:
      the plurality of intention predictions,
      the first confidence score,
      the second confidence score corresponding to the second intention prediction indicative of the common intention, and the third confidence score corresponding to the third intention prediction indicative of the common intention; and performing one or more operations based upon the first intention.

2. The method of claim 1, wherein determining the one or more sets of text comprises:
   determining, based upon the first set of text, a plurality of sets of text;
   determining, based upon the first set of text and the plurality of sets of text, a plurality of similarity scores associated with the plurality of sets of text, wherein each similarity score of the plurality of similarity scores corresponds to a measure of semantic similarity between the first set of text and a set of text of the plurality of sets of text; and
   selecting, based upon the plurality of similarity scores, the one or more sets of text from the plurality of sets of text.

3. The method of claim 2, wherein:
   selecting the one or more sets of text from the plurality of sets of text is performed based upon a determination that similarity scores, of the plurality of similarity scores, associated with the one or more sets of text meet a threshold similarity score.

4. The method of claim 2, wherein:
   a quantity of sets of text of the one or more sets of text is a defined number k; and
   selecting the one or more sets of text from the plurality of sets of text is performed based upon a determination that the one or more sets of text are associated with k highest similarity scores of the plurality of similarity scores.

5. The method of claim 1, wherein:
   determining the one or more sets of text is performed based upon information comprising at least one of:
      historical information comprising text received from client devices;
      text of an encyclopedia;
      text of news articles; or
      text associated with a field associated with the messaging interface.

6. The method of claim 1, wherein:
   the training information used to generate the trained machine learning model comprises at least one of:
      historical information comprising text received from client devices;
      text of an encyclopedia;
      text of news articles; or
      text associated with a field associated with the messaging interface.

7. The method of claim 1, wherein each intention prediction of the plurality of intention predictions comprises:
   an indication of an intention; and
   a confidence score associated with the intention prediction.

8. The method of claim 7, wherein:
   first intention predictions, of the plurality of intention predictions, are indicative of the first intention; and
   determining the first intention of the first set of text is based upon confidence scores of the first intention predictions.

9. The method of claim 1, wherein:
   each intention prediction of the plurality of intention predictions comprises an indication of an intention;
   the method comprises determining one or more intention prediction counts associated with one or more intentions comprising the first intention;
   each intention prediction count of the one or more intention prediction counts indicates a quantity of one or more intention predictions, of the plurality of intention predictions, indicative of an intention of the one or more intentions; and
   determining the first intention of the first set of text is based upon the one or more intention prediction counts.

10. The method of claim 9, wherein:
    determining the first intention of the first set of text is based upon a determination that a first intention prediction count, of the one or more intention prediction counts, associated with the first intention corresponds to a majority of the plurality of intention predictions.

11. The method of claim 9, wherein:
    determining the first intention of the first set of text is based upon a determination that a first intention prediction count, of the one or more intention prediction counts, associated with the first intention is the highest intention prediction count of the one or more intention prediction counts.

12. The method of claim 9, wherein:
    each intention prediction of the plurality of intention predictions comprises a confidence score associated with the intention prediction;
    first intention predictions, of the plurality of intention predictions, are indicative of the first intention; and
    determining the first intention of the first set of text is based upon confidence scores of the first intention predictions based upon at least one of:
       a determination that a first intention prediction count, of the one or more intention prediction counts, associated with the first intention does not correspond to a majority of the plurality of intention predictions; or
       a determination that the first intention prediction count is equal to a second intention prediction count, of the one or more intention prediction counts, associated with a second intention of the one or more intentions.

13. The method of claim 9, wherein:
    each intention prediction of the plurality of intention predictions comprises a confidence score associated with the intention prediction;
    the one or more intention prediction counts comprise a first intention prediction count associated with the first intention and a second intention prediction count associated with a second intention of the one or more intentions;
    the first intention prediction count is equal to the second intention prediction count;
    first intention predictions, of the plurality of intention predictions, are indicative of the first intention;
    second intention predictions, of the plurality of intention predictions, are indicative of the second intention; and
    determining the first intention of the first set of text comprises:
       determining a first score associated with the first intention based upon confidence scores of the first intention predictions;
       determining a second score associated with the second intention based upon confidence scores of the second intention predictions; and
       selecting the first intention based upon the first score and the second score.

14. The method of claim 1, wherein:
the first intention corresponds to a request for information; and
the one or more operations comprise transmitting the information to the client device.

15. The method of claim 1, wherein:
the first intention corresponds to a request to perform an action; and
the one or more operations comprise performing the action.

16. A non-transitory computer-readable medium storing instructions that when executed perform operations comprising:
training a machine learning model using training information to generate a trained machine learning model;
loading the trained machine learning model into a natural language generation engine;
receiving, from a client device, a first set of text via a messaging interface;
determining, based upon the first set of text and using the natural language generation engine loaded with the trained machine learning model, one or more sets of text semantically similar to the first set of text;
determining, based upon the first set of text and the one or more sets of text, a plurality of intention predictions comprising:
a first intention prediction based upon the first set of text; and
one or more second intention predictions generated based upon the one or more sets of text, wherein a second intention prediction of the one or more second intention predictions is generated based upon a second set of text of the one or more sets of text, wherein each intention prediction of the plurality of intention predictions comprises a confidence score associated with the intention prediction, wherein first intention predictions, of the plurality of intention predictions, are indicative of a first intention;
determining one or more intention prediction counts associated with one or more intentions comprising the first intention;
determining the first intention, of the first set of text, based upon confidence scores of the first intention predictions based upon at least one of:
a determination that a first intention prediction count, of the one or more intention prediction counts, associated with the first intention does not correspond to a majority of the plurality of intention predictions; or
a determination that the first intention prediction count is equal to a second intention prediction count, of the one or more intention prediction counts, associated with a second intention of the one or more intentions; and
performing one or more operations based upon the first intention.

17. The non-transitory computer-readable medium of claim 16, wherein determining the one or more sets of text comprises:
determining, based upon the first set of text, a plurality of sets of text;
determining, based upon the first set of text and the plurality of sets of text, a plurality of similarity scores associated with the plurality of sets of text, wherein each similarity score of the plurality of similarity scores corresponds to a measure of semantic similarity between the first set of text and a set of text of the plurality of sets of text; and
selecting, based upon the plurality of similarity scores, the one or more sets of text from the plurality of sets of text.

18. A device comprising:
a processor coupled to memory, the processor configured to execute instructions to perform operations comprising:
training a machine learning model using training information to generate a trained machine learning model;
loading the trained machine learning model into a natural language generation engine;
receiving, from a client device, a first set of text via a messaging interface;
determining, based upon the first set of text and using the natural language generation engine loaded with the trained machine learning model, one or more sets of text semantically similar to the first set of text;
determining, based upon the first set of text and the one or more sets of text, a plurality of intention predictions comprising:
a first intention prediction based upon the first set of text; and
one or more second intention predictions generated based upon the one or more sets of text, wherein a second intention prediction of the one or more second intention predictions is generated based upon a second set of text of the one or more sets of text, wherein each intention prediction of the plurality of intention predictions comprises a confidence score associated with the intention prediction, wherein first intention predictions, of the plurality of intention predictions, are indicative of a first intention, wherein second intention predictions, of the plurality of intention predictions, are indicative of a second intention;
determining one or more intention prediction counts associated with one or more intentions comprising the first intention and the second intention, wherein the one or more intention prediction counts comprise a first intention prediction count associated with the first intention and a second intention prediction count associated with the second intention, wherein the first intention prediction count is equal to the second intention prediction count;
determining a first score associated with the first intention based upon confidence scores of the first intention predictions;
determining a second score associated with the second intention based upon confidence scores of the second intention predictions;
selecting the first intention based upon the first score and the second score; and
performing one or more operations based upon the first intention.

19. The device of claim 18, wherein determining the one or more sets of text comprises:
determining, based upon the first set of text, a plurality of sets of text;
determining, based upon the first set of text and the plurality of sets of text, a plurality of similarity scores associated with the plurality of sets of text, wherein each similarity score of the plurality of similarity scores corresponds to a measure of semantic similarity between the first set of text and a set of text of the plurality of sets of text; and selecting, based upon the plurality of similarity scores, the one or more sets of text from the plurality of sets of text.

\* \* \* \* \*